(12) United States Patent
Mori et al.

(10) Patent No.: US 12,394,556 B2
(45) Date of Patent: Aug. 19, 2025

(54) MULTILAYER ELECTRONIC COMPONENT

(71) Applicant: TDK CORPORATION, Tokyo (JP)

(72) Inventors: Naoyuki Mori, Tokyo (JP); Jun Nakatsutsumi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 905 days.

(21) Appl. No.: 17/563,004

(22) Filed: Dec. 27, 2021

(65) Prior Publication Data
US 2022/0215998 A1 Jul. 7, 2022

(30) Foreign Application Priority Data
Jan. 5, 2021 (JP) .................................. 2021-000522

(51) Int. Cl.
*H01F 27/28* (2006.01)
*H01F 27/40* (2006.01)
*H01G 4/30* (2006.01)
*H01G 4/40* (2006.01)

(52) U.S. Cl.
CPC ....... *H01F 27/288* (2013.01); *H01F 27/2804* (2013.01); *H01F 27/40* (2013.01); *H01G 4/30* (2013.01); *H01G 4/40* (2013.01); *H01F 2027/2809* (2013.01)

(58) Field of Classification Search
CPC .... H01F 27/288; H01F 27/2885; H01F 27/36; H01F 2017/008; H01F 27/2804; H01F 2027/2809; H01F 17/0006; H01F 17/0013; H01F 5/003

USPC .................................. 336/84 R, 84 C, 84 M
See application file for complete search history.

(56) References Cited

U.S. PATENT DOCUMENTS

| 2006/0192632 A1* | 8/2006 | Nakai ..................... H03H 7/463 333/133 |
| 2016/0079952 A1* | 3/2016 | Kikuchi ................. H03K 17/56 333/132 |
| 2018/0034436 A1 | 2/2018 | Masuda et al. |
| 2019/0198230 A1 | 6/2019 | Miyahara et al. |

FOREIGN PATENT DOCUMENTS

| JP | 2004-266361 A | 9/2004 |
| JP | 2006129001 A * | 5/2006 |
| WO | 2014/192431 A1 | 12/2014 |

* cited by examiner

Primary Examiner — Tszfung J Chan
(74) Attorney, Agent, or Firm — Oliff PLC

(57) ABSTRACT

An electronic component includes a common port, a first signal port that selectively passes a first signal of a frequency within a first passband, a second signal port that selectively passes a second signal of a frequency within a second passband higher than the first passband, a first resonator provided between the common port and the first signal port in a circuit configuration, a second resonator provided between the common port and the second signal port in the circuit configuration, a stack, and a shield that covers a part of a surface of the stack. The shield includes a specific portion opposed to both the first and second resonators. A distance between the second resonator and the specific portion is greater than a distance between the first resonator and the specific portion.

13 Claims, 15 Drawing Sheets (a)

(b)

(c)

MULTILAYER ELECTRONIC COMPONENT

BACKGROUND OF THE INVENTION

1. Field of the Invention

The present invention relates to a multilayer electronic component including a stack and a shield covering a part of the surface of the stack.

2. Description of the Related Art

Recently, compact mobile communication apparatuses typified by cellular phones and smartphones have achieved greater functionality and further miniaturization, and the packing densities of electronic components have increased accordingly. As a result, spacings between the electronic components mounted on a mount substrate or distances from the electronic components to a shield case covering the electronic components have been reduced in the compact mobile communication apparatuses.

As the spacing between the electronic components is reduced, electromagnetic interference is more likely to occur between the electronic components. Further, as the distances between the shield case and the electronic components are reduced, the electronic components as packaged are more likely to have different characteristics than those as designed, due to capacitances formed by conductors inside the electronic components and the shield case.

To reduce electromagnetic interference between a plurality of electronic components and changes in the characteristics of the electronic components due to a shield case, electronic components such as the ones described in US 2018/0034436 A1 and US 2019/0198230 A1 have been known. US 2018/0034436 A1 describes a low-pass filter including a shield electrode formed on the side surfaces of a stack. US 2019/0198230 A1 describes a low-pass filter including a shield electrode disposed on the top surface and the side surfaces of a stack.

Compact mobile communication apparatuses are often configured to include an antenna that is used by both the system and a plurality of applications of different used frequency bands and use a branching filter to separate a plurality of signals for this antenna to transmit and receive.

A branching filter for separating a first signal of a frequency within a first frequency band and a second signal of a frequency within a second frequency band higher than the first frequency band from each other typically includes a common port, a first signal port, a second signal port, a first filter provided in a first signal path leading from the common port to the first signal port, and a second filter provided in a second signal path leading from the common port to the second signal port.

Suppose that a shield is formed on the surface of the branching filter. With the shield provided on the surface of the branching filter, the components of the filter can be capacitively coupled with the shield. The formation of capacitance by the capacitive coupling makes impedance matching difficult since the impedance of the filter becomes different from the designed one. The higher the passband of the filter is, the more likely that capacitive coupling will occur between the filter components and the shield. Thus, if the shield is formed on the surface of the foregoing branching filter that includes the first and second filters, the second filter is susceptible to the capacitive coupling and impedance matching will be difficult compared to the first filter. It has thus been difficult to achieve the desired characteristics.

The foregoing problem is not limited to branching filters and applies to multilayer electronic components in general that include a plurality of resonators and handle a plurality of signals of respective different frequencies.

SUMMARY OF THE INVENTION

An object of the present invention is to provide a multilayer electronic component that can achieve desired characteristics while preventing the occurrence of an electromagnetic malfunction due to high density packaging.

A multilayer electronic component according to the present invention includes: a common port; a first signal port that selectively passes a first signal of a frequency within a first passband; a second signal port that selectively passes a second signal of a frequency within a second passband higher than the first passband; a first resonator provided between the common port and the first signal port in a circuit configuration; a second resonator provided between the common port and the second signal port in the circuit configuration; a stack for integrating the common port, the first signal port, the second signal port, the first resonator, and the second resonator, the stack including a plurality of dielectric layers and a plurality of conductor layers stacked together; and a shield that is formed of a conductor and covers a part of a surface of the stack.

The first and second resonators are formed using the plurality of conductor layers. The stack has a bottom surface and a top surface located at both ends in a stacking direction of the plurality of dielectric layers, and four side surfaces connecting the bottom surface and the top surface. The shield includes a specific portion opposed to both the first and second resonators. A distance between the second resonator and the specific portion is greater than a distance between the first resonator and the specific portion.

In the multilayer electronic component according to the present invention, the shield may include a side covering portion that covers one of the four side surfaces as at least a part of the specific portion. In such a case, a distance between the second resonator and the side covering portion may be greater than a distance between the first resonator and the side covering portion.

In the multilayer electronic component according to the present invention, the shield may include a top covering portion that covers the top surface as at least a part of the specific portion. In such a case, a distance between the second resonator and the top covering portion may be greater than a distance between the first resonator and the top covering portion.

In the multilayer electronic component according to the present invention, the first resonator may include at least one first inductor, and the second resonator may include at least one second inductor. In such a case, a distance between the at least one second inductor and the specific portion may be greater than a distance between the at least one first inductor and the specific portion.

In the multilayer electronic component according to the present invention, the first resonator may include at least one first capacitor, and the second resonator may include at least one second capacitor. In such a case, a distance between the at least one second capacitor and the specific portion may be greater than a distance between the at least one first capacitor and the specific portion.

The multilayer electronic component according to the present invention may further include a circuit that is provided between the common port and the first resonator in the circuit configuration and includes at least one element formed using the plurality of conductor layers. In such a case, the specific portion may be opposed to the circuit. A distance between the circuit and the specific portion may be greater than the distance between the first resonator and the specific portion. The element may be an inductor.

In the multilayer electronic component according to the present invention, the common port, the first signal port, and the second signal port may be provided on the bottom surface of the stack. In such a case, the shield may entirely cover the top surface and the four side surfaces.

The multilayer electronic component according to the present invention may further include a third signal port that selectively passes a third signal of a frequency within a third passband higher than the first passband and lower than the second passband, and a third resonator provided between the common port and the third signal port in the circuit configuration. The third resonator may be formed using the plurality of conductor layers. In such a case, the specific portion may be opposed to the third resonator. The distance between the second resonator and the specific portion may be greater than a distance between the third resonator and the specific portion. The distance between the third resonator and the specific portion may be greater than the distance between the first resonator and the specific portion.

In the multilayer electronic component according to the present invention, the first and second resonators are integrated with the stack. The shield covers a part of the surface of the stack. The shield includes the specific portion opposed to both the first and second resonators. The distance between the second resonator and the specific portion is greater than the distance between the first resonator and the specific portion. According to the present invention, a multilayer electronic component that can achieve desired characteristics can thus be implemented while preventing the occurrence of an electromagnetic malfunction due to high density packaging.

Other and further objects, features and advantages of the present invention will appear more fully from the following description.

DETAILED DESCRIPTION OF THE PREFERRED EMBODIMENTS

An embodiment of the present invention will now be described in detail with reference to the drawings. First, the configuration of a multilayer electronic component (hereinafter simply referred to as electronic component) according to the embodiment of the invention will be outlined with reference to FIG. 1. An electronic component 1 according to the present embodiment is a branching filter (triplexer) including a first filter, a second filter, and a third filter. The first filter selectively passes a first signal of a frequency within a first passband. The second filter selectively passes a second signal of a frequency within a second passband which is higher than the first passband. The third filter selectively passes a third signal of a frequency within a third passband which is higher than the first passband and lower than the second passband.

Figure 1:
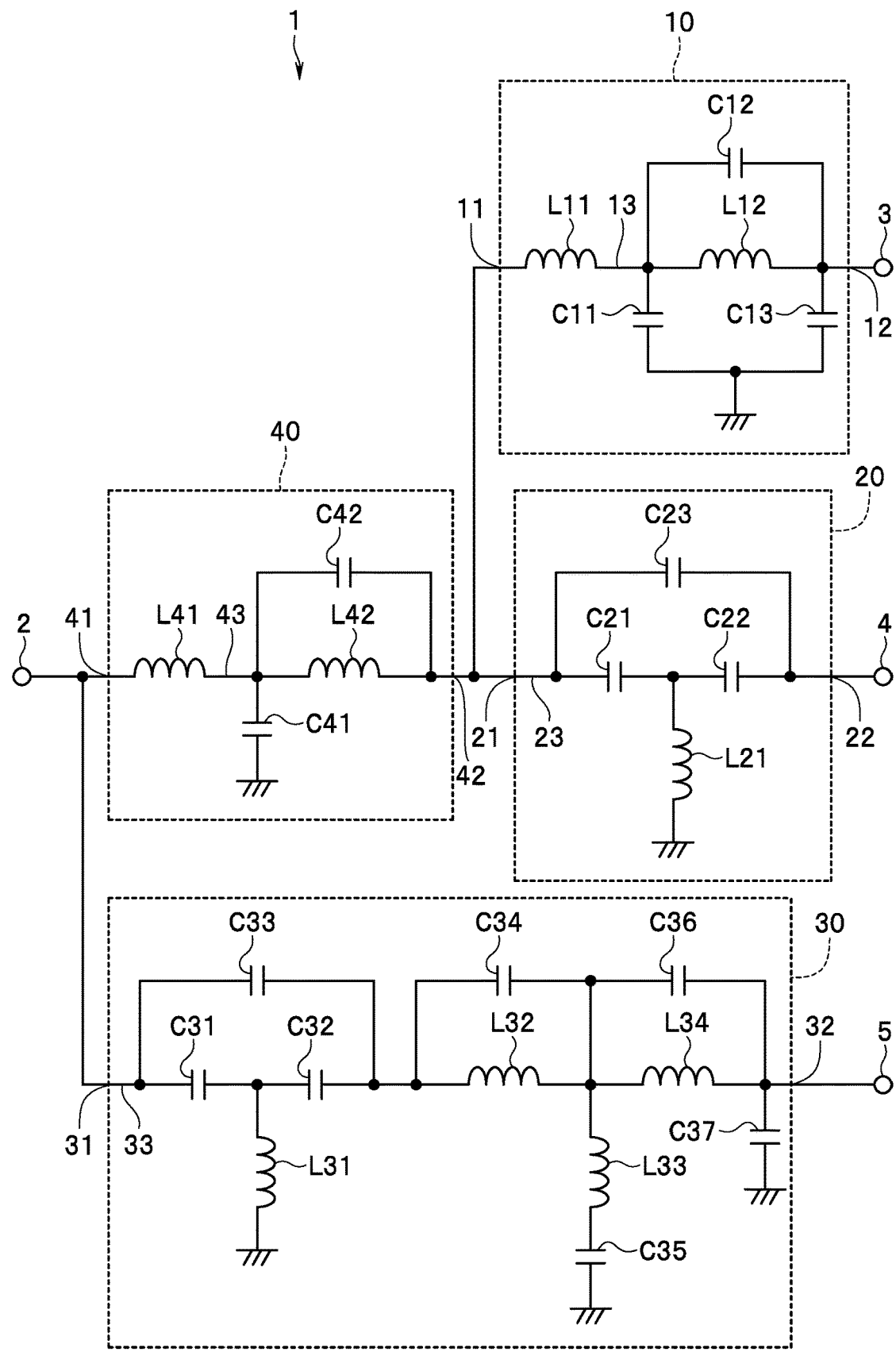
FIG. 1 is a circuit diagram showing a circuit configuration of a multilayer electronic component according to an embodiment of the invention.

As shown in FIG. 1, the electronic component 1 includes a common port 2, signal ports 3, 4, and 5, resonators 10, 20, and 30, and an LC circuit 40.

The signal port 3 selectively passes the first signal of the frequency within the first passband. The resonator 10 is provided between the common port 2 and the signal port 3 in a circuit configuration. The resonator 10 constitutes the first filter.

The signal port 5 selectively passes the second signal of the frequency within the second passband. The resonator 30 is provided between the common port 2 and the signal port 5 in the circuit configuration. The resonator 30 constitutes the second filter.

The signal port 4 selectively passes the third signal of the frequency within the third passband. The resonator 20 is provided between the common port 2 and the signal port 4 in the circuit configuration. The resonator 20 constitutes the third filter.

The LC circuit 40 is provided between the common port 2 and the resonators 10 and 20 in the circuit configuration. In the present application, the expression of "in the(a) circuit configuration" is used to indicate not layout in physical configuration but layout in the circuit diagram.

The resonator 10 corresponds to "the first resonator" in the present invention. The resonator 20 corresponds to "the third resonator" of the present invention. The resonator 30 corresponds to "the second resonator" in the present invention. The signal port 3 corresponds to "the first signal port" in the present invention. The signal port 4 corresponds to "the third signal port" in the present invention. The signal port 5 corresponds to "the second signal port" in the present invention.

Next, an example of the configuration of the resonators 10, 20, and 30 and the LC circuit 40 will be described with reference to FIG. 1. The resonators 10, 20, and 30 each include at least one inductor and at least one capacitor.

The resonator 10 includes a port 11 connected to the LC circuit 40, a port 12 connected to the signal port 3, a path 13 connecting the ports 11 and 12, inductors L11 and L12, and capacitors C11, C12, and C13. The inductors L11 and L12 are provided in this order in series in the path 13 from the port 11 side. The capacitor C11 is provided between a connection point of the inductors L11 and L12 and the ground. The capacitor C12 is connected in parallel with the inductor L12. The capacitor C13 is provided between the path 13 and the ground, between the inductor L12 and the port 12.

The resonator 20 includes a port 21 connected to the LC circuit 40, a port 22 connected to the signal port 4, a path 23 connecting the ports 21 and 22, an inductor L21, and capacitors C21, C22, and C23. The capacitors C21 and C22 are provided in this order in series in the path 23 from the port 21 side. The capacitor C23 is connected in parallel with the capacitors C21 and C22. The inductor L21 is provided between a connection point of the capacitors C21 and C22 and the ground.

The resonator 30 includes a port 31 connected to the common port 2, a port 32 connected to the signal port 5, a path 33 connecting the ports 31 and 32, inductors L31, L32, L33, and L34, and capacitors C31, C32, C33, C34, C35, C36, and C37. The capacitors C31 and C32 and the inductors L32 and L34 are provided in this order in series in the path 33 from the port 31 side. The capacitor C33 is connected in parallel with the capacitors C31 and C32. The inductor L31 is provided between a connection point of the capacitors C31 and C32 and the ground. The capacitor C34 is connected in parallel with the inductor L32. The inductor L33 is connected to a connection point of the inductors L32 and L34. The capacitor C35 is provided between the inductor L33 and the ground. The capacitor C36 is connected in parallel with the inductor L34. The capacitor C37 is provided between the path 33 and the ground, between the inductor L34 and the port 32.

The LC circuit 40 includes a port 41 connected to the common port 2, a port 42 connected to the port 11 of the resonator 10 and the port 21 of the resonator 20, a path 43 connecting the ports 41 and 42, inductors IA1 and L42, and capacitors C41 and C42. The inductors IA1 and L42 are provided in this order in series in the path 43 from the port 41 side. The capacitor C41 is provided between a connection point of the inductors IA1 and L42 and the ground. The capacitor C42 is connected in parallel with the inductor L42.

The first signal of the frequency within the first passband passes selectively through the path 43 of the LC circuit 40 and the path 13 of the resonator 10. The second signal of the frequency within the second passband passes selectively through the path 33 of the resonator 30. The third signal of the frequency within the third passband passes selectively through the path 43 of the LC circuit 40 and the path 23 of the resonator 20. In such a manner, the electronic component 1 separates the first, second, and third signals.

Figure 2:
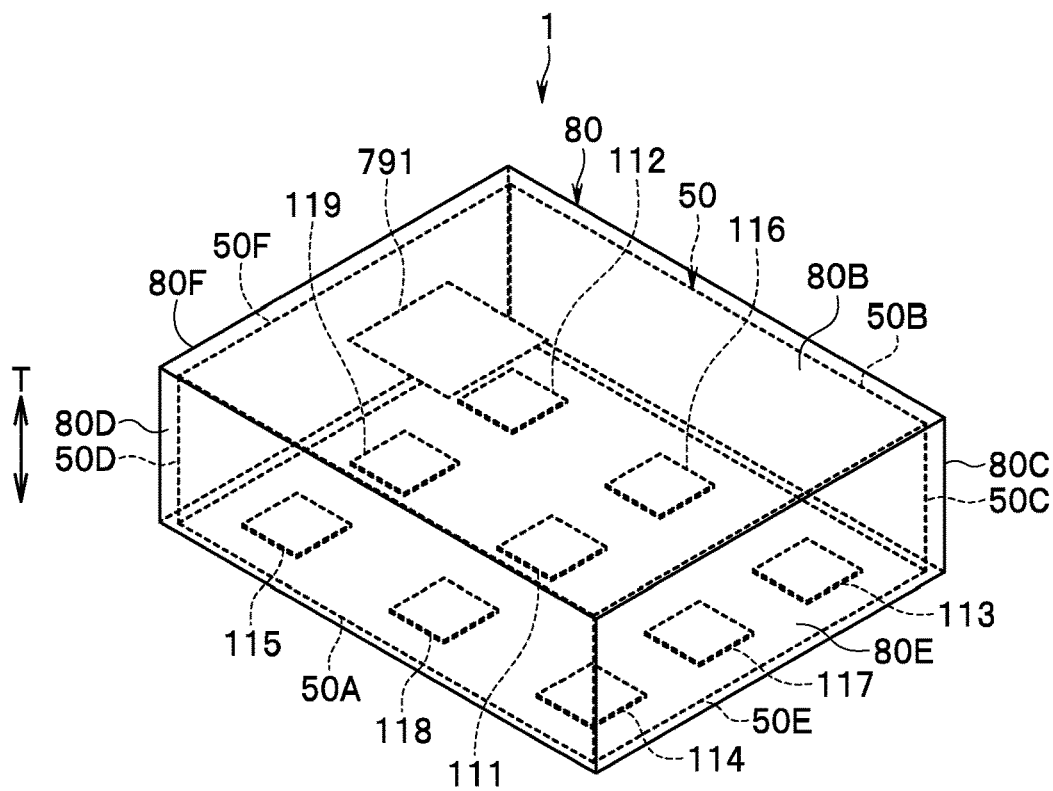
FIG. 2 is an external perspective view showing the multilayer electronic component according to the embodiment of the invention.
Figure 3:
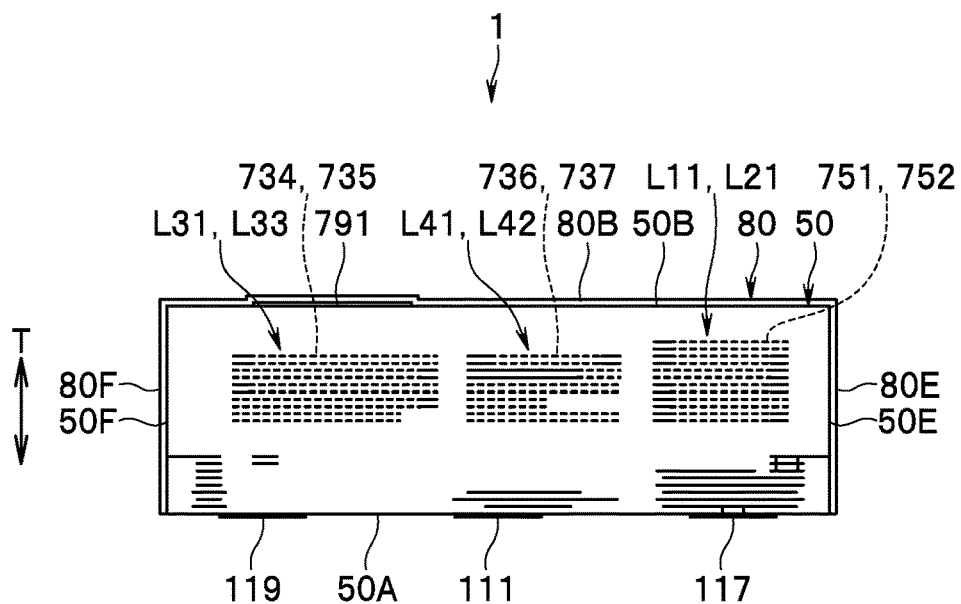
FIG. 3 is a cross-sectional view of the multilayer electronic component of FIG. 2.
Figure 4:
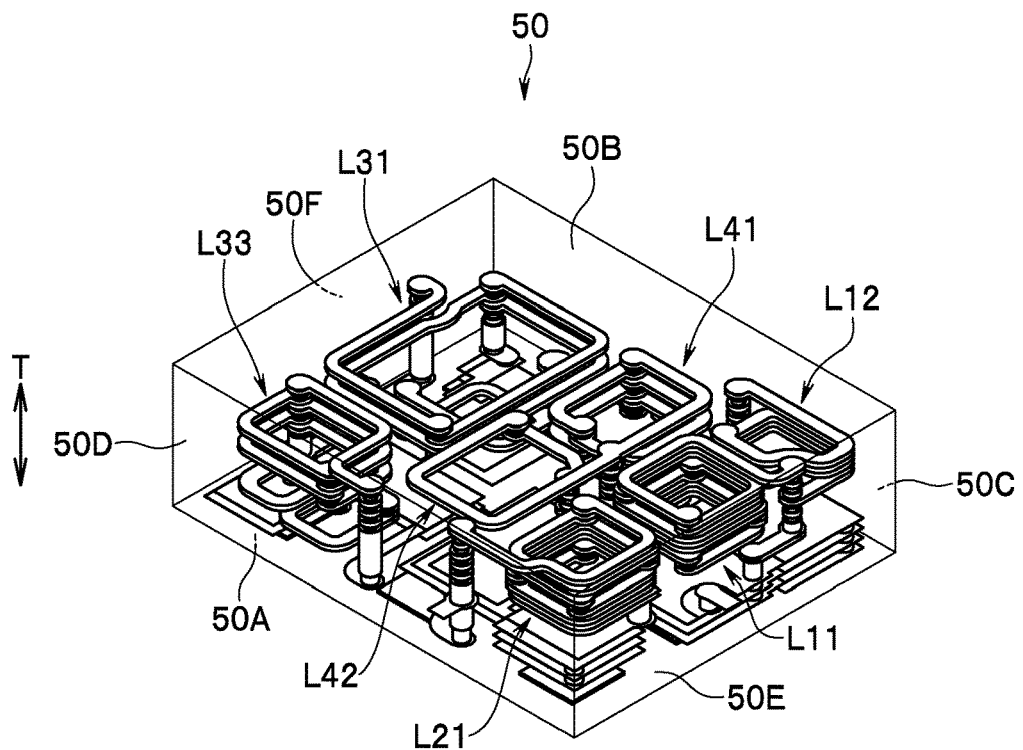
FIG. 4 is an internal perspective view showing a stack of the multilayer electronic component of FIG. 2.
Figure 5:
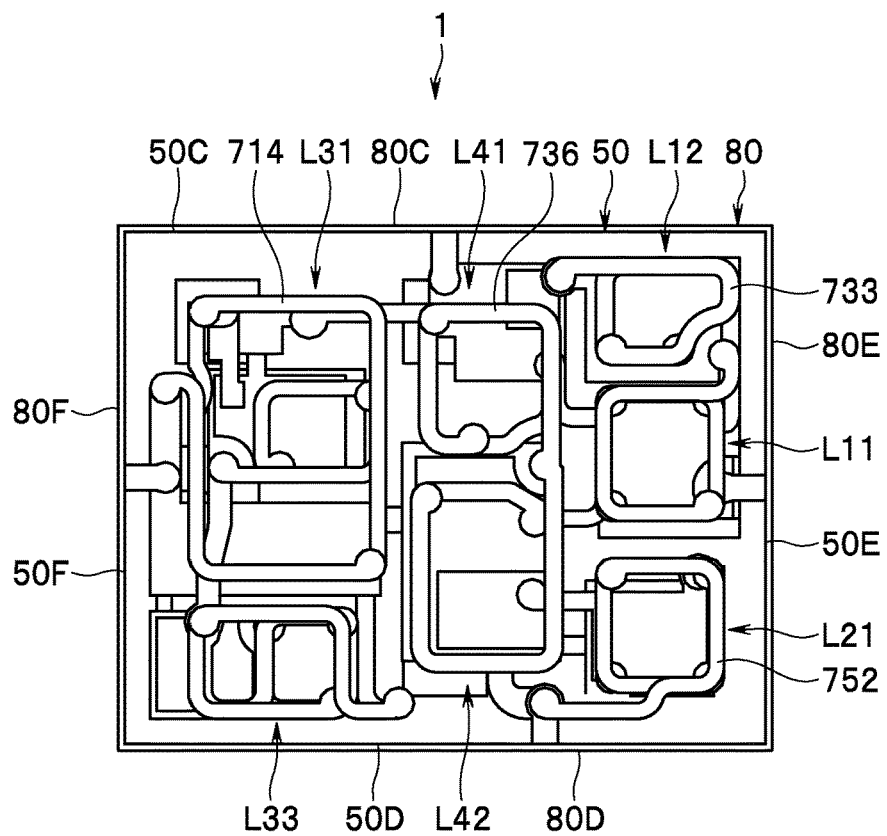
FIG. 5 is an internal plan view showing the stack of the multilayer electronic component of FIG. 2.

Next, other configurations of the electronic component 1 will be described with reference to FIGS. 2 to 5. FIG. 2 is a perspective view showing the appearance of the electronic component 1. FIG. 3 is a cross-sectional view of the electronic component 1. FIG. 4 is an internal perspective view of a stack of the electronic component 1. FIG. 5 is an internal plan view of the stack of the electronic component 1.

The electronic component 1 further includes a stack 50 including a plurality of dielectric layers and a plurality of conductor layers stacked together, and a shield 80 that is formed of a conductor and covers a part of the surface of the stack 50. The stack 50 is intended to integrate the common port 2, the signal ports 3 to 5, the resonators 10, 20, and 30, and the LC circuit 40. The resonators 10, 20, and 30 and the LC circuit 40 are formed using the plurality of conductor layers.

The stack 50 has a bottom surface 50A and a top surface 50B located at both ends in a stacking direction T of the plurality of dielectric layers, and four side surfaces 50C to 50F connecting the bottom surface 50A and the top surface 50B. The side surfaces 50C and 50D are opposite to each other. The side surfaces 50E and 50F are opposite to each other. The side surfaces 50C to 50F are perpendicular to the top surface 50B and the bottom surface 50A.

The electronic component 1 further includes terminals 111, 112, 113, 114, 115, 116, 117, 118, and 119 provided on the bottom surface 50A of the stack 50. The terminal 111 is located at the center of the bottom surface 50A. The terminal 112 is located near the corner where the bottom surface 50A and the side surfaces 50C and 50F make contact. The terminal 113 is located near the corner where the bottom surface 50A and the side surfaces 50C and 50E make contact. The terminal 114 is located near the corner where the bottom surface 50A and the side surfaces 50D and 50E make contact. The terminal 115 is located near the corner where the bottom surface 50A and the side surfaces 50D and 50F make contact. The terminal 116 is located between the terminals 112 and 113. The terminal 117 is located between the terminals 113 and 114. The terminal 118 is located between the terminals 114 and 115. The terminal 119 is located between the terminals 112 and 115.

The terminal 112 corresponds to the common port 2, the terminal 113 to the signal port 3, the terminal 114 to the signal port 4, and the terminal 115 to the signal port 5. The common port 2 and the signal ports 3 to 5 are thus provided on the bottom surface 50A of the stack 50. Each of the terminals 111, 116 to 119 is connected to the ground. The shield 80 is electrically connected to the terminals 111, 116 to 119.

The shield 80 entirely covers the top surface 50B and the four side surfaces 50C to 50F of the stack 50. The shield 80 includes five portions: one covering the top surface 50B of the stack 50; the other four covering the four side surfaces 50C to 50F of the stack 50. Of the five portions of the shield 80, the one portion covering the top surface 50B of the stack 50 will be referred to as the top covering portion 80B, and the four portions covering the side surfaces 50C to 50F of the stack 50 will be referred to as the side covering portions 80C to 80F. The shield 80 may include a plurality of metal layers stacked together.

Reference is now made to FIG. 6A to FIG. 14 to describe an example of the dielectric layers constituting the stack 50 and the configuration of a plurality of conductor layers formed on the dielectric layers and a plurality of through holes formed in the dielectric layers. In this example, the stack 50 includes twenty-nine dielectric layers stacked together. The twenty-nine dielectric layers will be referred to as a first to a twenty-ninth dielectric layer in the order from bottom to top. The first to twenty-ninth dielectric layers are denoted by reference numerals 51 to 79, respectively.

In FIG. 6A to FIG. 13C, each circle represents a through hole. The dielectric layers 51 to 74 each have a plurality of through holes. Each of the plurality of through holes is connected to a conductor layer or another through hole.

Figure 6A:
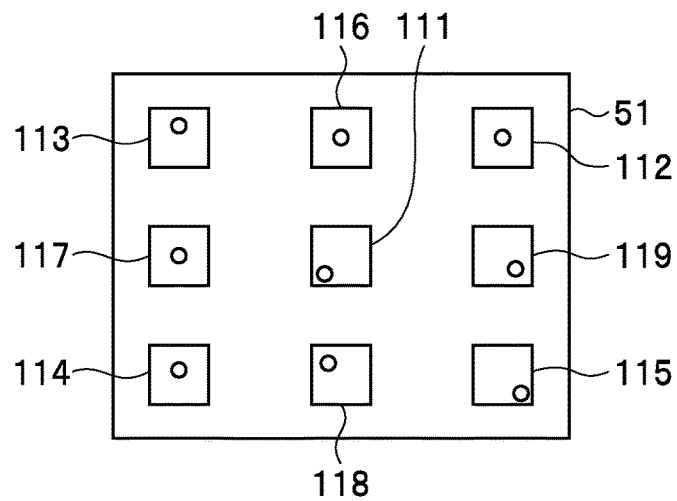
FIG. 6A to FIG. 6C are explanatory diagrams showing respective patterned surfaces of first to third dielectric layers of the stack shown in FIG. 4 and FIG. 5.

FIG. 6A shows the patterned surface of the first dielectric layer 51. The terminals 111 to 119 are formed on the patterned surface of the dielectric layer 51.

Figure 6B:
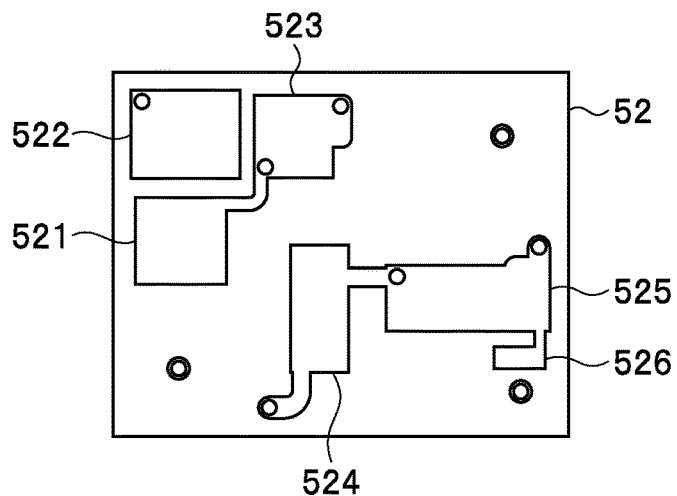

FIG. 6B shows the patterned surface of the second dielectric layer 52. Conductor layers 521, 522, 523, 524, 525, and 526 are formed on the patterned surface of the dielectric layer 52. The conductor layer 523 is connected to the conductor layer 521. The conductor layer 525 is connected to the conductor layer 524. The conductor layer 526 is connected to the conductor layer 525.

Figure 6C:
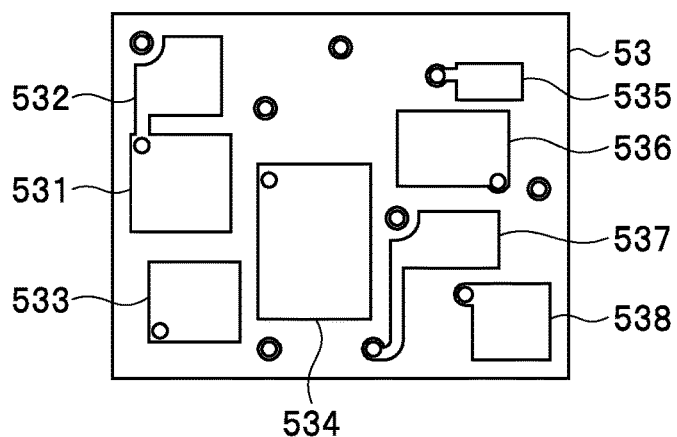

FIG. 6C shows the patterned surface of the third dielectric layer 53. Conductor layers 531, 532, 533, 534, 535, 536, 537, and 538 are formed on the patterned surface of the dielectric layer 53. The conductor layer 532 is connected to the conductor layer 531.

Figure 7A:
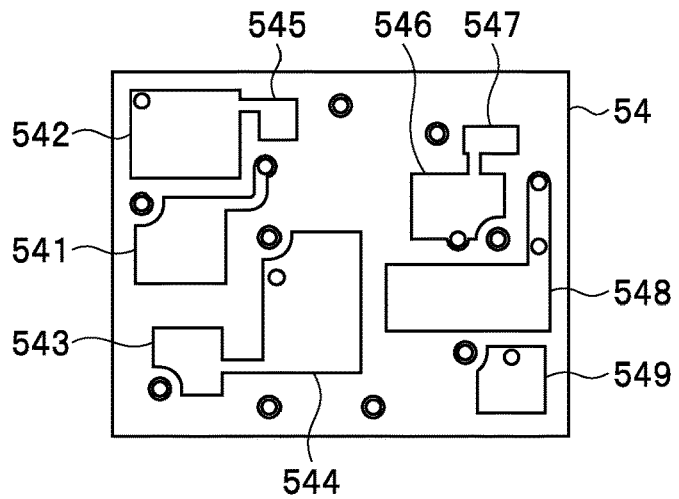
FIG. 7A to FIG. 7C are explanatory diagrams showing respective patterned surfaces of fourth to sixth dielectric layers of the stack shown in FIG. 4 and FIG. 5.

FIG. 7A shows the patterned surface of the fourth dielectric layer 54. Conductor layers 541, 542, 543, 544, 545, 546, 547, 548, and 549 are formed on the patterned surface of the dielectric layer 54. The conductor layer 545 is connected to the conductor layer 542. The conductor layer 544 is connected to the conductor layer 543. The conductor layer 547 is connected to the conductor layer 546.

Figure 7B:
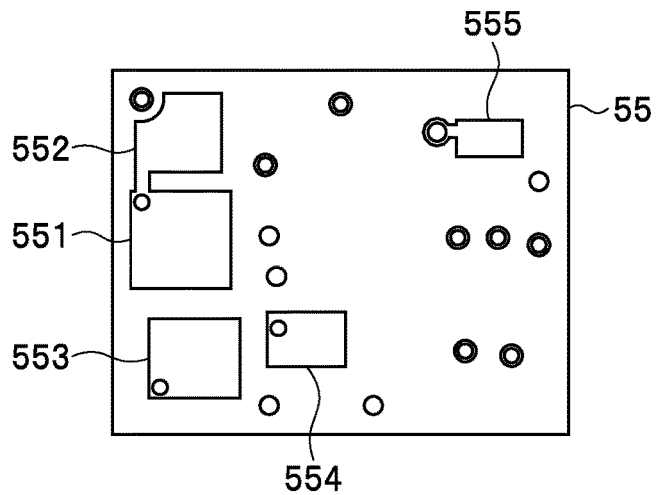

FIG. 7B shows the patterned surface of the fifth dielectric layer 55. Conductor layers 551, 552, 553, 554, and 555 are formed on the patterned surface of the dielectric layer 55. The conductor layer 552 is connected to the conductor layer 551.

Figure 7C:
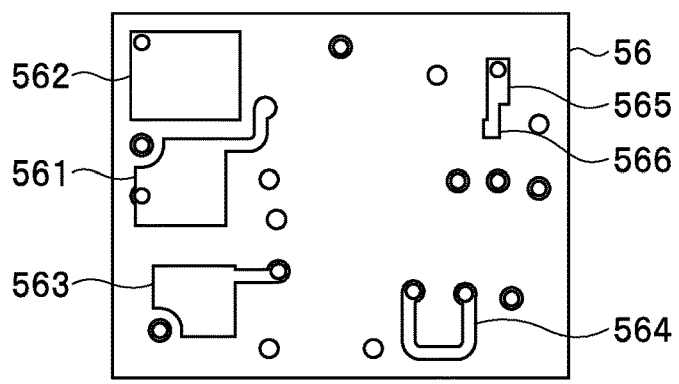

FIG. 7C shows the patterned surface of the sixth dielectric layer 56. Conductor layers 561, 562, 563, 564, 565, and 566 are formed on the patterned surface of the dielectric layer 56. The conductor layer 566 is connected to the conductor layer 565.

Figure 8A:
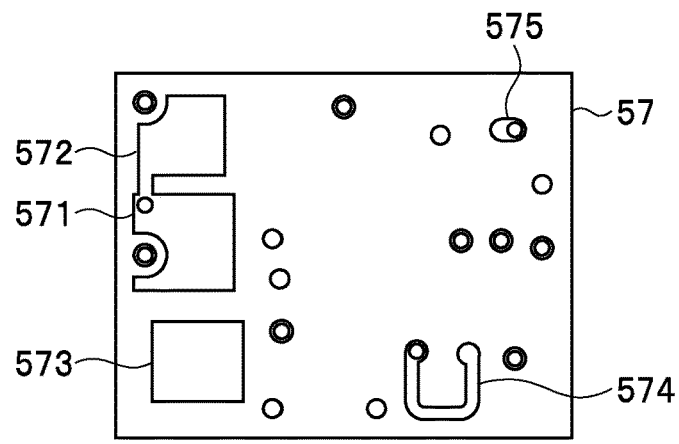
FIG. 8A to FIG. 8C are explanatory diagrams showing respective patterned surfaces of seventh to ninth dielectric layers of the stack shown in FIG. 4 and FIG. 5.

FIG. 8A shows the patterned surface of the seventh dielectric layer 57. Conductor layers 571, 572, 573, 574, and 575 are formed on the patterned surface of the dielectric layer 57. The conductor layer 572 is connected to the conductor layer 571.

Figure 8B:
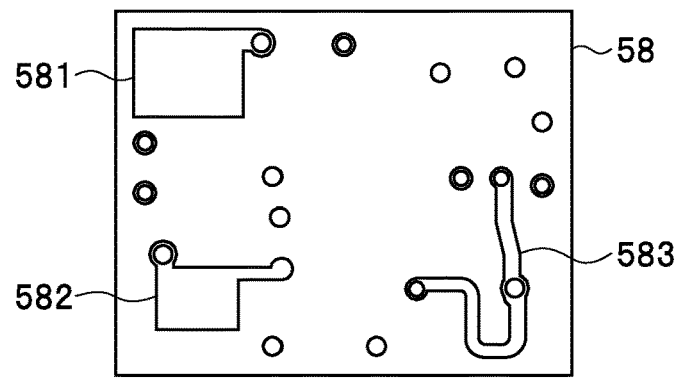

FIG. 8B shows the patterned surface of the eighth dielectric layer 58. Conductor layers 581, 582, and 583 are formed on the patterned surface of the dielectric layer 58.

Figure 8C:
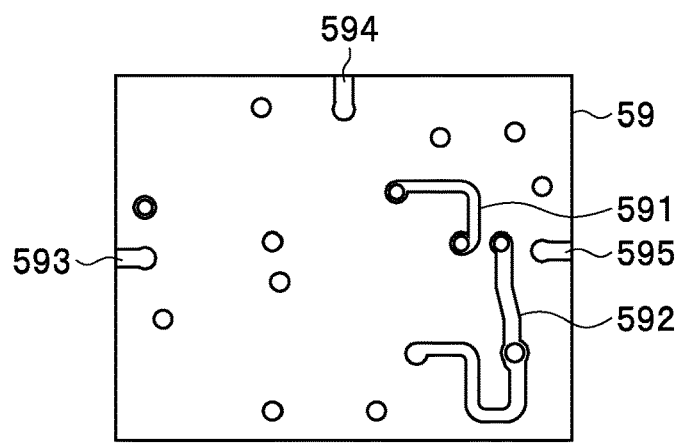

FIG. 8C shows the patterned surface of the ninth dielectric layer 59. Conductor layers 591, 592, 593, 594, and 595 are formed on the patterned surface of the dielectric layer 59. The conductor layer 593 is connected to the side covering portion 80E of the shield 80. The conductor layer 594 is connected to the side covering portion 80C of the shield 80. The conductor layer 595 is connected to the side covering portion 80F of the shield 80.

Figure 9A:
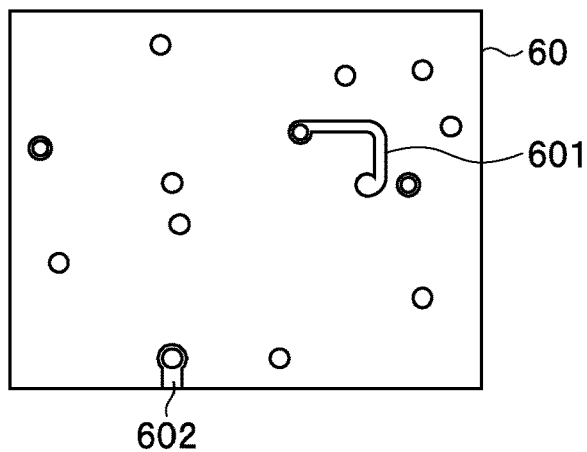
FIG. 9A to FIG. 9C are explanatory diagrams showing respective patterned surfaces of tenth to twelfth dielectric layers of the stack shown in FIG. 4 and FIG. 5.

FIG. 9A shows the patterned surface of the tenth dielectric layer 60. Conductor layers 601 and 602 are formed on the patterned surface of the dielectric layer 60. The conductor layer 602 is connected to the side covering portion 80D of the shield 80.

Figure 9B:
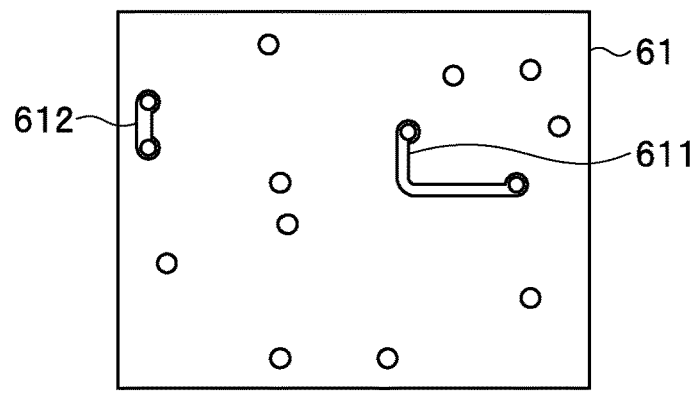

FIG. 9B shows the patterned surface of the eleventh dielectric layer 61. Conductor layers 611 and 612 are formed on the patterned surface of the dielectric layer 61.

Figure 9C:
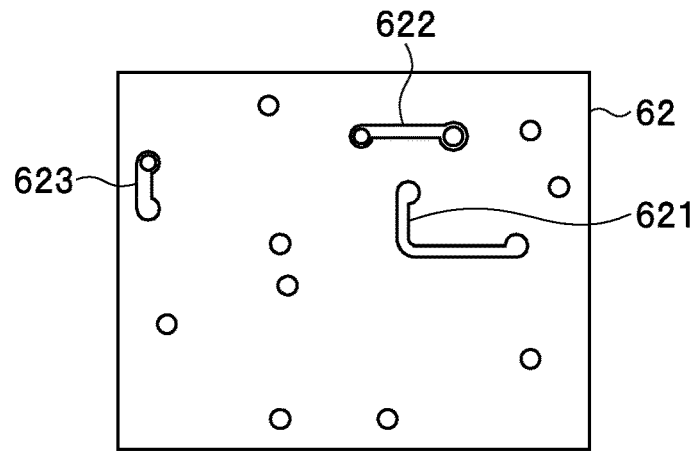

FIG. 9C shows the patterned surface of the twelfth dielectric layer 62. Conductor layers 621, 622, and 623 are formed on the patterned surface of the dielectric layer 62.

Figure 10A:
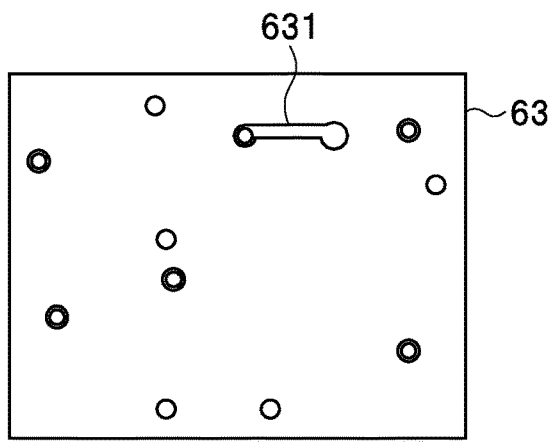
FIG. 10A to FIG. 10C are explanatory diagrams showing respective patterned surfaces of thirteenth to fifteenth dielectric layers of the stack shown in FIG. 4 and FIG. 5.

FIG. 10A shows the patterned surface of the thirteenth dielectric layer 63. Conductor layer 631 is formed on the patterned surface of the dielectric layer 63.

Figure 10B:
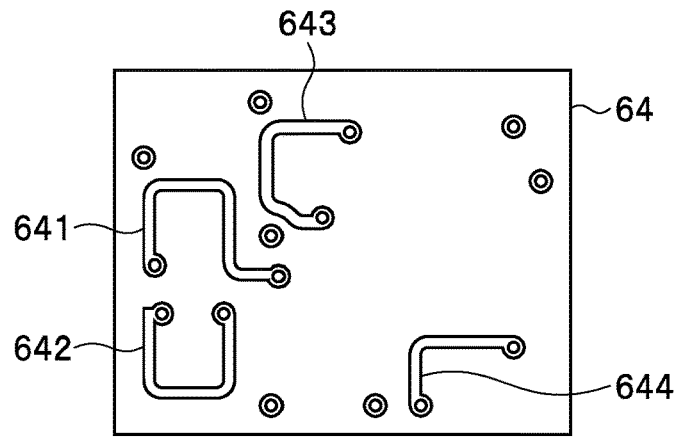

FIG. 10B shows the patterned surface of the fourteenth dielectric layer 64. Conductor layers 641, 642, 643, and 644 are formed on the patterned surface of the dielectric layer 64.

Figure 10C:
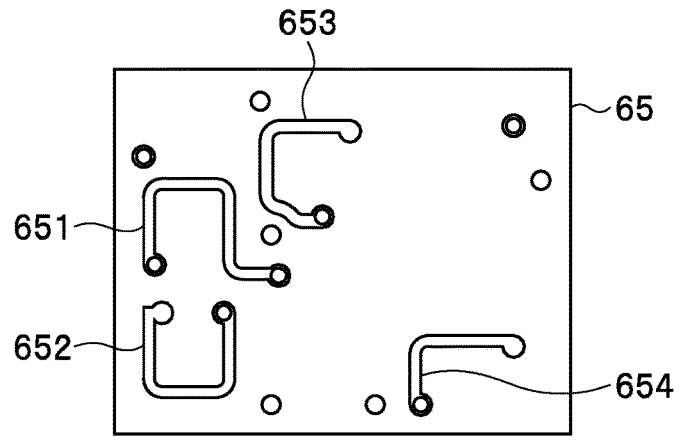

FIG. 10C shows the patterned surface of the fifteenth dielectric layer 65. Conductor layers 651, 652, 653, and 654 are formed on the patterned surface of the dielectric layer 65.

Figure 11A:
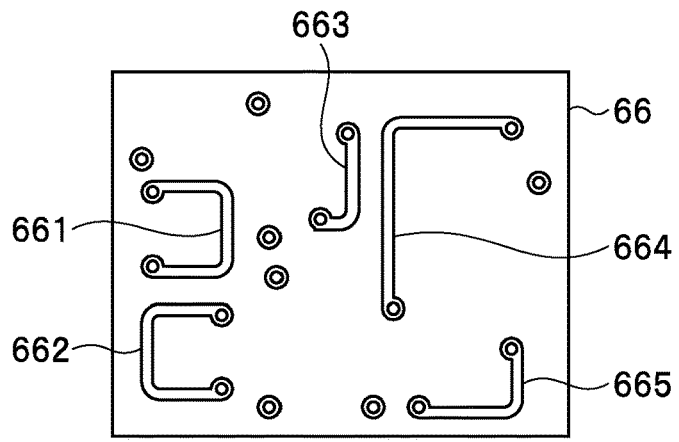
FIG. 11A to FIG. 11C are explanatory diagrams showing respective patterned surfaces of sixteenth to eighteenth dielectric layers of the stack shown in FIG. 4 and FIG. 5.

FIG. 11A shows the patterned surface of the sixteenth dielectric layer 66. Conductor layers 661, 662, 663, 664, and 665 are formed on the patterned surface of the dielectric layer 66.

Figure 11B:
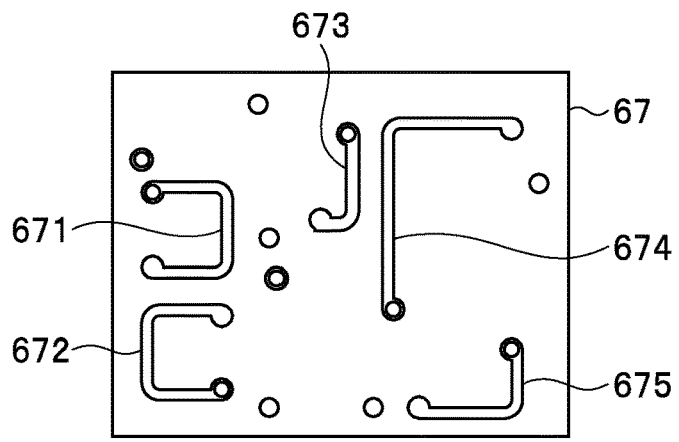

FIG. 11B shows the patterned surface of the seventeenth dielectric layer 67. Conductor layers 671, 672, 673, 674, and 675 are formed on the patterned surface of the dielectric layer 67.

Figure 11C:
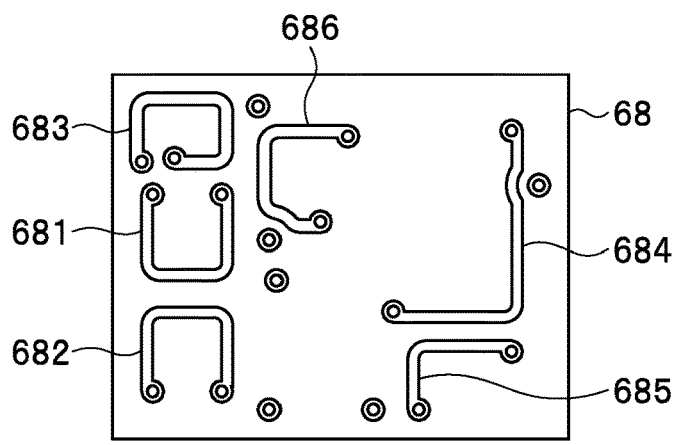

FIG. 11C shows the patterned surface of the eighteenth dielectric layer 68. Conductor layers 681, 682, 683, 684, 685, and 686 are formed on the patterned surface of the dielectric layer 68.

Figure 12A:
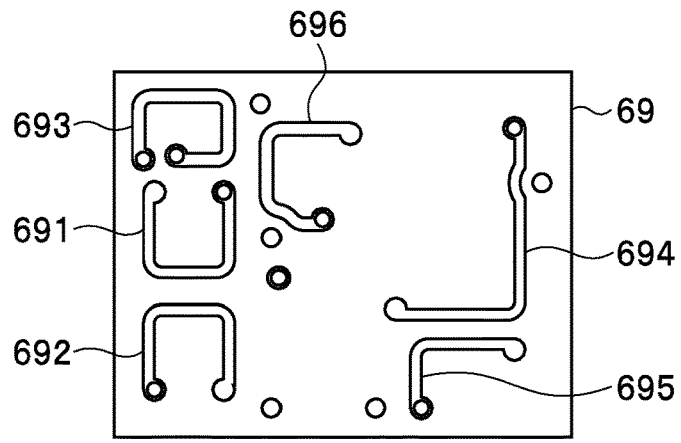
FIG. 12A to FIG. 12C are explanatory diagrams showing respective patterned surfaces of nineteenth to twenty-first dielectric layers of the stack shown in FIG. 4 and FIG. 5.

FIG. 12A shows the patterned surface of the nineteenth dielectric layer 69. Conductor layers 691, 692, 693, 694, 695, and 696 are formed on the patterned surface of the dielectric layer 69.

Figure 12B:
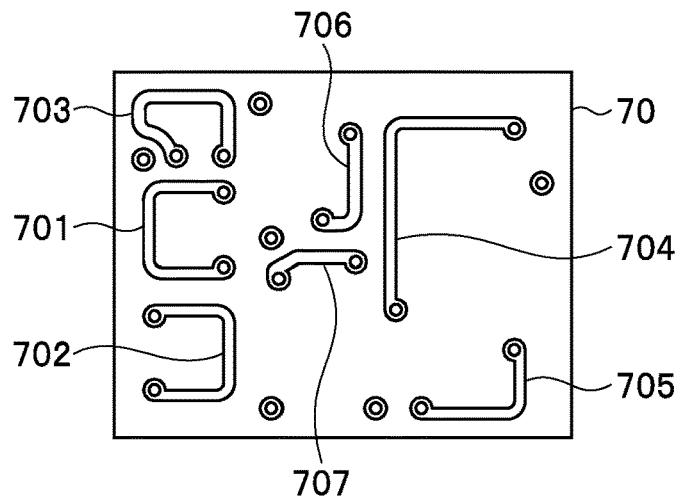

FIG. 12B shows the patterned surface of the twentieth dielectric layer 70. Conductor layers 701, 702, 703, 704, 705, 706, and 707 are formed on the patterned surface of the dielectric layer 70.

Figure 12C:
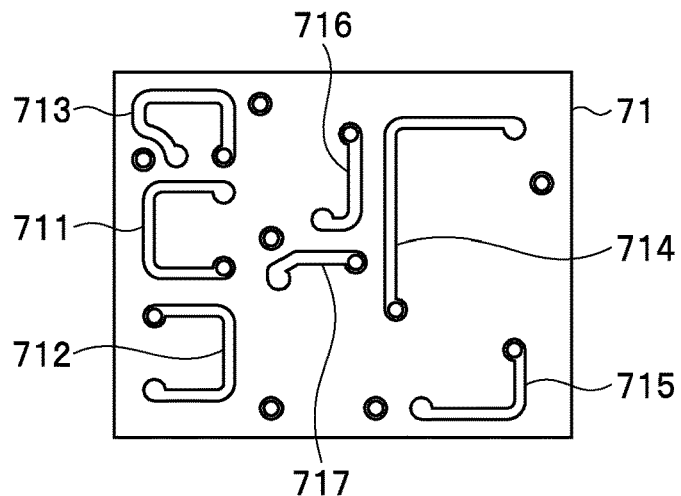

FIG. 12C shows the patterned surface of the twenty-first dielectric layer 71. Conductor layers 711, 712, 713, 714, 715, 716, and 717 are formed on the patterned surface of the dielectric layer 71.

Figure 13A:
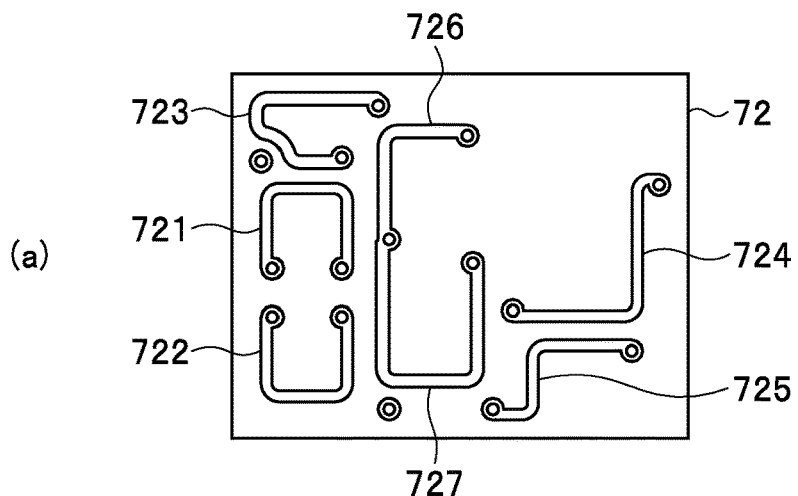
FIG. 13A to FIG. 13C are explanatory diagrams showing respective patterned surfaces of twenty-second to twenty-fourth dielectric layers of the stack shown in FIG. 4 and FIG. 5.

FIG. 13A shows the patterned surface of the twenty-second dielectric layer 72. Conductor layers 721, 722, 723, 724, 725, 726, and 727 are formed on the patterned surface of the dielectric layer 72. The conductor layer 727 is connected to the conductor layer 726.

Figure 13B:
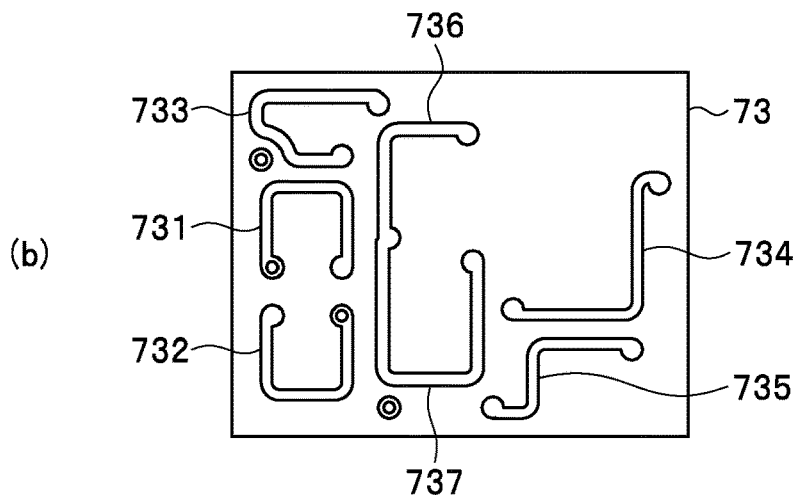

FIG. 13B shows the patterned surface of the twenty-third dielectric layer 73. Conductor layers 731, 732, 733, 734, 735, 736, and 737 are formed on the patterned surface of the dielectric layer 73. The conductor layer 737 is connected to the conductor layer 736.

Figure 13C:
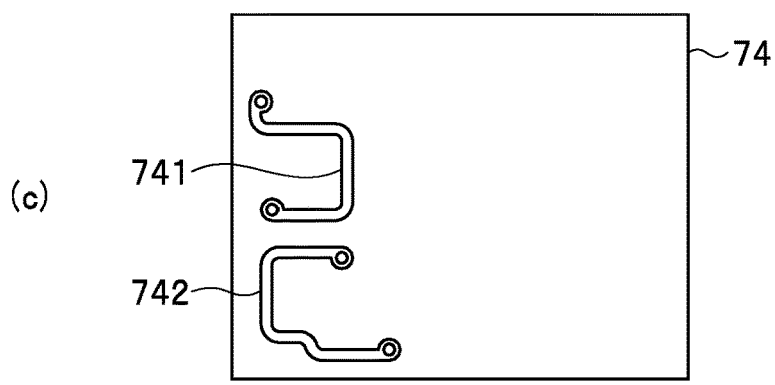

FIG. 13C shows the patterned surface of the twenty-fourth dielectric layer 74. Conductor layers 741 and 742 are formed on the patterned surface of the dielectric layer 74.

Figure 14A:
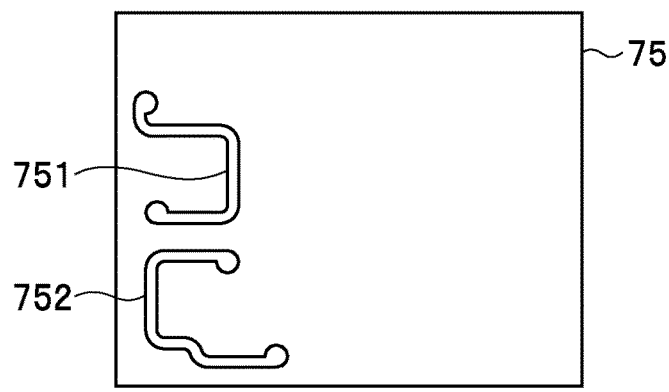
FIG. 14A is an explanatory diagram showing a patterned surface of a twenty-fifth dielectric layer of the stack shown in FIG. 4 and FIG. 5.

FIG. 14A shows the patterned surface of the twenty-fifth dielectric layer 75. Conductor layers 751 and 752 are formed on the patterned surface of the dielectric layer 75.

Figure 14B:
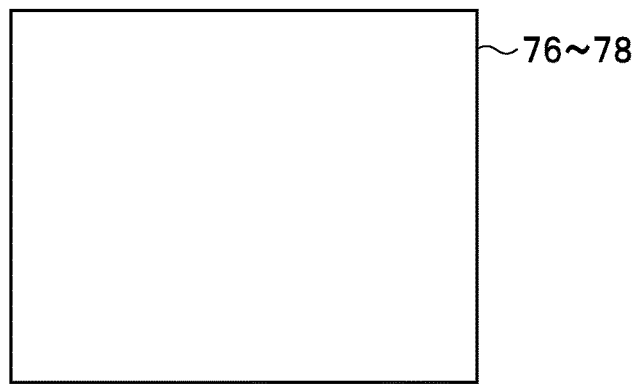
FIG. 14B is an explanatory diagram showing a patterned surface of each of twenty-sixth to twenty-eighth dielectric layers of the stack shown in FIG. 4 and FIG. 5.

FIG. 14B shows the patterned surface of each of the twenty-sixth to twenty-eighth dielectric layers 76 to 78. No conductor layers or through holes are formed on/in each of the dielectric layers 76 to 78.

Figure 14C:
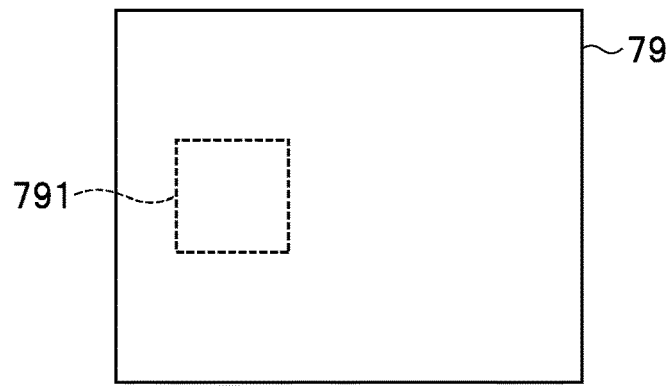
FIG. 14C is an explanatory diagram showing a patterned surface of a twenty-ninth dielectric layer of the stack shown in FIG. 4 and FIG. 5.

FIG. 14C shows the patterned surface of the twenty-ninth dielectric layer 79. A mark 791 made of a conductor layer is formed on a marked surface of the dielectric layer 79 opposite to the patterned surface.

The stack 50 shown in FIG. 2 to FIG. 5 is formed by stacking the first to twenty-ninth dielectric layers 51 to 79 such that the patterned surface of the first dielectric layer 51 also serves as the bottom surface 50A of the stack 50, while the marked surface of the twenty-ninth dielectric layer 79 and the top surface of the mark 791 constitute the top surface 50B of the stack 50.

When the first to twenty-ninth dielectric layers 51 to 79 are stacked, each of the plurality of through holes shown in FIGS. 6A to 13C is connected to a conductor layer overlapping in the stacking direction T or to another through hole overlapping in the stacking direction T. Of the plurality of through holes shown in FIGS. 6A to 13C, the ones located within a terminal or a conductor layer are connected to the terminal or conductor layer.

Correspondences between the circuit components of the electronic component 1 shown in FIG. 1 and the internal components of the stack 50 shown in FIG. 6A to FIG. 14C will now be described. The components of the resonator 10 will initially be described. The inductor L11 is composed of the conductor layers 641, 651, 661, 671, 681, 691, 701, 711, 721, 731, 741, and 751 shown in FIG. 10B to FIG. 14A and the through holes connected to those conductor layers.

The inductor L12 is composed of the conductor layers 683, 693, 703, 713, 723, and 733 shown in FIG. 11C to FIG. 13B and the through holes connected to those conductor layers.

The capacitor C11 is composed of the conductor layers 521, 531, 541, 551, 561, and 571 shown in FIG. 6B to FIG. 8A and the dielectric layers 52 to 56 each interposed between two of those conductor layers.

The capacitor C12 is composed of the conductor layers 522, 532, 542, 552, 562, 572, and 581 shown in FIG. 6B to FIG. 8B and the dielectric layers 52 to 57 each interposed between two of those conductor layers.

The capacitor C13 is composed of the conductor layers 523 and 543 shown in FIG. 6B and FIG. 7A and the dielectric layers 52 and 53 each interposed between two of those conductor layers.

Next, the components of the resonator 20 will be described. The inductor L21 is composed of the conductor layers 642, 652, 662, 672, 682, 692, 702, 712, 722, 732, 742, and 752 shown in FIG. 10B to FIG. 14A and the through holes connected to those conductor layers.

The capacitor C21 is composed of the conductor layers 544 and 545 shown in FIG. 7A and FIG. 7B and the dielectric layer 54 interposed between two of those conductor layers.

The capacitor C22 is composed of the conductor layers 553, 563, 573, and 582 shown in FIG. 7B to FIG. 8B and the dielectric layers 55 to 57 each interposed between two of those conductor layers.

The capacitor C23 is composed of the conductor layers 533 and 543 shown in FIG. 6C and FIG. 7A and the dielectric layer 53 interposed between two of those conductor layers.

Next, the components of the resonator 30 will be described. The inductor L31 is composed of the conductor layers 664, 674, 684, 694, 704, 714, 724, and 734 shown in FIG. 11A to FIG. 13B and the through holes connected to those conductor layers.

The inductor L32 is composed of the conductor layers 591, 601, 611, and 621 shown in FIG. 8C to FIG. 9C and the through holes connected to those conductor layers.

The inductor L33 is composed of the conductor layers 644, 654, 665, 675, 685, 695, 705, 715, 725, and 735 shown in FIG. 10B to FIG. 13B and the through holes connected to those conductor layers.

The inductor L34 is composed of the conductor layers 564, 574, 583, and 592 shown in FIG. 7C to FIG. 8C and the through holes connected to those conductor layers.

The capacitor C31 is composed of the conductor layers 555 and 565 shown in FIG. 7B and FIG. 7C and the dielectric layer 55 interposed between two of those conductor layers.

The capacitor C32 is composed of the conductor layers 546 and 566 shown in FIG. 7A and FIG. 7C and the dielectric layers 54 and 55 each interposed between two of those conductor layers.

The capacitor C33 is composed of the conductor layers 535, 547, and 555 shown in FIG. 6C to FIG. 7B and the dielectric layers 53 and 54 each interposed between two of those conductor layers.

The capacitor C34 is composed of the conductor layers 536 and 546 shown in FIG. 6C and FIG. 7A and the dielectric layer 53 interposed between two of those conductor layers.

The capacitor C35 is composed of the conductor layers 525, 537, and 548 shown in FIG. 6B to FIG. 7A and the dielectric layers 52 and 53 each interposed between two of those conductor layers.

The capacitor C36 is composed of the conductor layers 538 and 549 shown in FIG. 6C and FIG. 7A and the dielectric layer 53 interposed between two of those conductor layers.

The capacitor C37 is composed of the conductor layers 526 and 538 shown in FIG. 6B and FIG. 6C and the dielectric layer 52 interposed between two of those conductor layers.

Next, the components of the LC circuit 40 will be described. The inductor L41 is composed of the conductor layers 643, 653, 663, 673, 686, 696, 706, 716, 726, and 736 shown in FIG. 10B to FIG. 13B and the through holes connected to those conductor layers.

The inductor L42 is composed of the conductor layers 707, 701, 727, and 737 shown in FIG. 12B to FIG. 13B and the through holes connected to those conductor layers.

The capacitor C41 is composed of the conductor layers 524 and 534 shown in FIG. 6B and FIG. 6C and the dielectric layer 52 interposed between two of those conductor layers.

The capacitor C42 is composed of the conductor layers 534 and 544 shown in FIG. 6C and FIG. 7A and the dielectric layer 53 interposed between two of those conductor layers.

Next, a connection relationship between the shield 80 and the internal components of the stack 50 will be described. The side covering portion 80C of the shield 80 is connected to the terminals 116 and 117 via the conductor layers 521, 523, and 594 and a plurality of through holes shown in FIGS. 6A to 8C. The side covering portion 80D of the shield 80 is connected to the terminals 111, 118, and 119 via the conductor layers 524, 525, and 602 and a plurality of through holes shown in FIGS. 6A to 9A. The side covering portion 80E of the shield 80 is connected to the terminals 116 and 117 via the conductor layers 521, 523, 561, and 593 and a plurality of through holes shown in FIGS. 6A to 8C. The side covering portion 80F of the shield 80 is connected to the terminals 111, 118, and 119 via the conductor layers 524, 525, and 595 and a plurality of through holes shown in FIGS. 6A to 8C.

Next, structural features of the electronic component 1 according to the present embodiment will be described with reference to FIGS. 3 to 5. The shield 80 includes a specific portion opposed to both the resonators 10 and 30. The distance between the resonator 30 and the specific portion is greater than the distance between the resonator 10 and the specific portion.

The specific portion will now be described in concrete terms. The side covering portion 80C of the shield 80 corresponds to the specific portion. The inductor L12 and the capacitor C12 of the resonator 10 are opposed to the side covering portion 80C. In the present embodiment, in particular, the distances between the conductor layers 683, 693, 703, 713, 723, and 733, constituting the inductor L12, and the side covering portion 80C are the same as those between the conductor layers 522, 542, 562, and 581, constituting the capacitor C12, and the side covering portion 80C. The inductor L31 and the capacitor C33 of the resonator 30 are also opposed to the side covering portion 80C. The distances between the conductor layers 664, 674, 704, and 714, constituting the inductor L31, and the side covering portion 80C are greater than the distance between the conductor layer 535, constituting the capacitor C33, and the side covering portion 80C.

As shown in FIG. 5, the distance between the inductor L31 (conductor layer 714) of the resonator 30 and the side covering portion 80C is greater than the distance between the inductor L12 (conductor layer 733) of the resonator 10 and the side covering portion 80C. The distance between the resonator 30 and the side covering portion 80C is thus greater than the distance between the resonator 10 and the side covering portion 80C. As can be seen in FIGS. 6B to 8B, the distance between the capacitor C33 (conductor layer 535) of the resonator 30 and the side covering portion 80C is greater than the distance between the capacitor C12 (conductor layers 522, 542, 562, and 581) of the resonator 10 and the side covering portion 80C.

The top covering portion 80B of the shield 80 also corresponds to the specific portion. The conductor layer 751, constituting the inductor L11 of the resonator 10, is opposed to the top covering portion 80B. The conductor layer 734, constituting the inductor L31 of the resonator 30, and the conductor layer 735, constituting the inductor L33 of the resonator 30, are opposed to the top covering portion 80B. As shown in FIG. 3, the distance between the inductors L31 and L33 (conductor layers 734 and 735) of the resonator 30 and the top covering portion 80B is greater than the distance between the inductor L11 (conductor layer 751) of the resonator 10 and the top covering portion 80B. The distance between the resonator 30 and the top covering portion 80B is thus greater than the distance between the resonator 10 and the top covering portion 80B.

The top covering portion 80B of the shield 80 is also opposed to the resonator 20. The conductor layer 752, constituting the inductor L21 of the resonator 20, is opposed to the top covering portion 80B. As shown in FIG. 3, the distance between the inductors L31 and L33 (conductor layers 734 and 735) of the resonator 30 and the top covering portion 80B is greater than the distance between the inductor L21 (conductor layer 752) of the resonator 20 and the top covering portion 80B. The distance between the resonator 30 and the top covering portion 80B is thus greater than the distance between the resonator 20 and the top covering portion 80B.

The side covering portion 80E of the shield 80 is opposed to both the resonators 10 and 20. The inductor L12 and the capacitors C11 and C12 of the resonator 10 are opposed to the side covering portion 80E. In the present embodiment, in particular, the distances between the conductor layers 683, 693, 703, 713, 723, and 733 constituting the inductor L12 and the side covering portion 80E, the distances between the conductor layers 531, 551, and 571 constituting the capacitor C11 and the side covering portion 80E, and the distances between the conductor layers 522, 542, 562, and 581 constituting the capacitor C12 and the side covering portion 80E are equal to each other. The inductor L21 and the capacitors C22 and C23 of the resonator 20 are also opposed to the side covering portion 80E. The distances between the conductor layers 642, 652, 662, 672, 682, 692, 722, 732, 742, and 752, constituting the inductor L21, and the side covering portion 80E are greater than the distance between the conductor layers 533 and 553, constituting the capacitors C22 and C23, and the side covering portion 80E.

As shown in FIG. 5, the distance between the inductor L21 (conductor layer 752) of the resonator 20 and the side covering portion 80E is greater than the distance between the inductor L12 (conductor layer 733) of the resonator 10 and the side covering portion 80E. As can be seen in FIGS. 6B to 8B, the distance between the capacitors C22 and C23 (conductor layers 533 and 553) of the resonator 20 and the side covering portion 80E is greater than the distance between the capacitors C11 and C12 (conductor layers 522, 531, 542, 551, 562, 571 and 581) of the resonator 10 and the side covering portion 80C. The distance between the resonator 20 and the side covering portion 80E is thus greater than the distance between the resonator 10 and the side covering portion 80E.

The side covering portion 80C and the top covering portion 80B of the shield 80 is also opposed to the LC circuit 40. The conductor layers 643, 653, 686, 696, 726, and 736, constituting the inductor L41 of the LC circuit 40, is opposed to the side covering portion 80C. As shown in FIG. 5, the distance between the inductor L41 (conductor layer 736) of the LC circuit 40 and the side covering portion 80C is greater than the distance between the inductor L12 (conductor layer 733) of the resonator 10 and the side covering portion 80C. The distance between the LC circuit 40 and the side covering portion 80C is thus greater than the distance between the resonator 10 and the side covering portion 80C.

The conductor layer 736, constituting the inductor L41 of the LC circuit 40, and the conductor layer 737, constituting the inductor L42 of the LC circuit 40, are opposed to the top covering portion 80B. As shown in FIG. 3, the distance between the inductors L41 and L42 (conductor layers 736 and 737) of the LC circuit 40 and the top covering portion 80B is greater than the distance between the inductor L11 (conductor layer 751) of the resonator 10 and the top covering portion 80B. The distance between the LC circuit 40 and the top covering portion 80B is thus greater than the distance between the resonator 10 and the top covering portion 80B.

The specific portion is not limited to the foregoing examples. For example, a part of the top covering portion 80B or a part of a side covering portion may serve as the specific portion. A plurality of side covering portions may be regarded as a specific portion.

Figure 15:
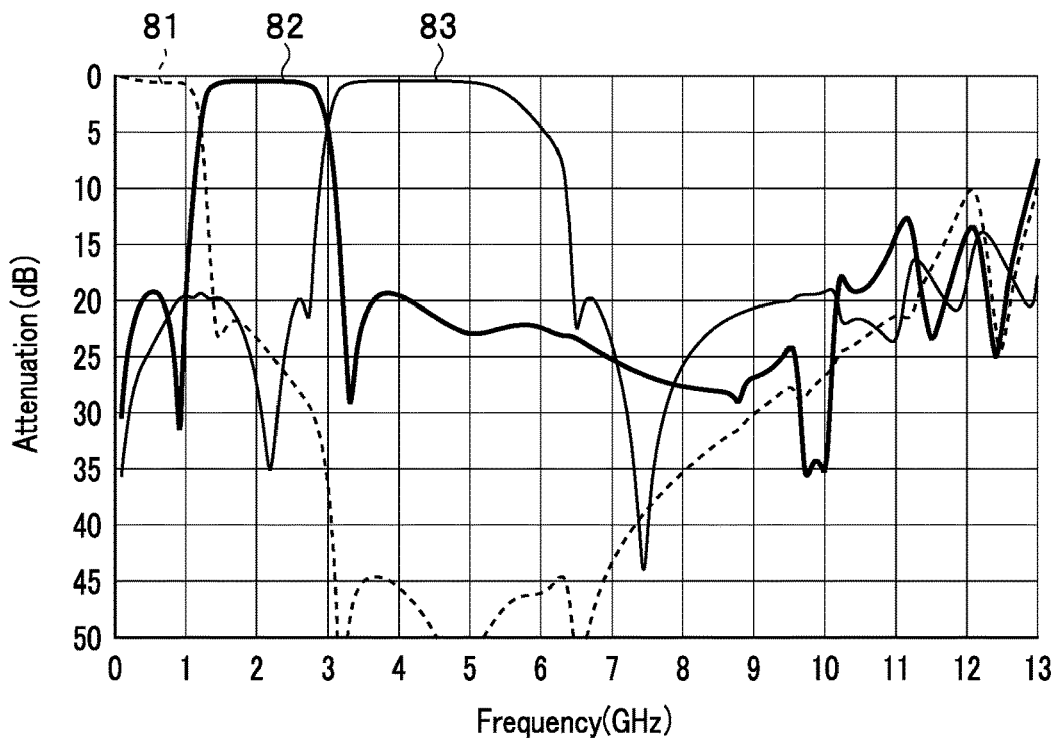
FIG. 15 is a characteristic diagram showing an example of pass characteristic of the multilayer electronic component according to the embodiment of the invention.
Figure 16:
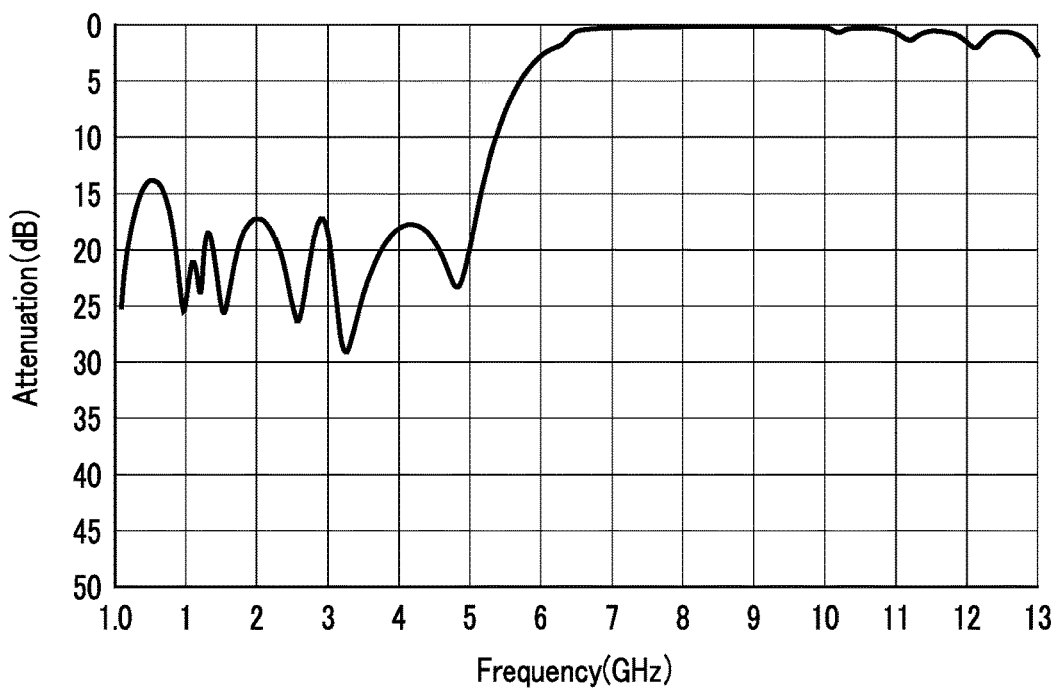
FIG. 16 is a characteristic diagram showing an example of reflection characteristic of the multilayer electronic component according to the embodiment of the invention.

Next, an example of the characteristics of the electronic component 1 according to the present embodiment will be described. FIG. 15 is a characteristic chart showing an example of pass characteristics of the electronic component 1. FIG. 16 is a characteristic chart showing an example of reflection characteristics of the electronic component 1. In FIGS. 15 and 16, the horizontal axis indicates the frequency, and the vertical axis indicates the attenuation. In FIG. 15, the curve denoted by the reference numeral 81 represents the pass characteristic of the first filter constituted by the resonator 10 provided between the common port 2 and the signal port 3. The curve denoted by the reference numeral 82 represents the pass characteristic of the third filter constituted by the resonator 20 provided between the common port 2 and the signal port 4. The curve denoted by the reference numeral 83 represents the pass characteristic of the second filter constituted by the resonator 30 provided between the common port 2 and the signal port 5.

Next, the operation and effects of the electronic component 1 according to the present embodiment will be described. In the present embodiment, the shield 80 covers a part of the surface of the stack 50. In the present embodiment, in particular, the shield 80 covers the top surface 50B and the four side surfaces 50C to 50F of the stack 50. Thus, according to the present embodiment, electromagnetic interference between a plurality of electronic components and changes in the characteristics of the electronic component due to a shield case can be prevented.

In the present embodiment, the resonators 10, 20, and 30 are integrated with the stack 50. The resonators 10, 20, and 30 are formed using the plurality of conductor layers included in the stack 50. The resonator 10 is provided in the signal path through which the first signal of the frequency within the first passband passes. The resonator 20 is provided in the signal path through which the third signal of the frequency within the third passband passes. The resonator 30 is provided in the signal path through which the second signal of the frequency within the second passband passes.

In the present embodiment, the shield 80 is provided on the surface of the stack 50. The components of each of the resonators 10, 20, and 30 can thus be capacitively coupled with the shield 80. The resonators 10 and 30 will now be compared. The resonator 30 is provided in the signal path of a higher passband than the resonator 10. The resonator 30 is thus susceptible to the capacitive coupling and impedance matching will be difficult compared to the resonator 10.

As described above, in the present embodiment, the distance between the resonator 30 and the specific portion of the shield 80 is greater than the distance between the resonator 10 and the specific portion of the shield 80. Therefore, according to the present embodiment, the effect of the capacitive coupling with the shield 80 on the resonator 30 can thereby be reduced to facilitate impedance matching.

Similarly, the resonator 20 is provided in the signal path of a higher passband than the resonator 10. In the present embodiment, the distance between the resonator 20 and the specific portion of the shield 80 is greater than the distance between the resonator 10 and the specific portion of the shield 80. Therefore, according to the present embodiment, the effect of the capacitive coupling with the shield 80 on the resonator 20 can thereby be reduced to facilitate impedance matching.

The resonators 20 and 30 will now be compared. The resonator 30 is provided in the signal path of a higher passband than the resonator 20. As described above, in the present embodiment, the distance between the resonator 30 and the specific portion of the shield 80 is greater than the distance between the resonator 20 and the specific portion of the shield 80.

Moreover, in the present embodiment, the LC circuit 40 is provided between the common port 2 and the resonators 10 and 20. The LC circuit 40 includes at least one element formed by using a plurality of conductor layers included in the stack 50. The at least one element of the LC circuit 40 can also be capacitively coupled with the shield 80. Changes in the impedance of the LC circuit 40 have a higher impact on the resonator 30 than on the resonators 10 and 20. As described above, in the present embodiment, the distance between the LC circuit 40 and the specific portion of the shield 80 is greater than the distance between the resonator 10 and the specific portion of the shield 80. As a result, according to the present embodiment, the impact of changes in the impedance of the LC circuit 40 on the resonator 30 can thereby be reduced.

As described above, according to the present embodiment, desired characteristics can be achieved while preventing the occurrence of electromagnetic malfunctions due to high density packaging.

In the present embodiment, the distance between the inductor L31 or L33 of the resonator 30 and the specific portion (top covering portion 80B or side covering portion 80C) of the shield 80 is the distance between the resonator 30 and the specific portion of the shield 80. However, not only the inductors and capacitors but the conductor layers and through holes constituting the path 33 of the resonator 30 can be capacitively coupled with the shield 80 as well. If a conductor layer or through hole constituting a part of the path 33 of the resonator 30 is closer to the specific portion of the shield 80 than the elements included in the resonator 30 such as the inductors L31 and L33, the effect of the capacitive coupling with the shield 80 on the resonator 30 can be reduced by increasing the distance between the conductor layer or through hole and the specific portion of the shield 80.

The foregoing description of the path 33 of the resonator 30 also applies to the path 23 of the resonator 20 and the path 43 of the LC circuit 40.

In the present embodiment, the distance between the resonator 30 and the shield 80 is increased without increasing the distance between the resonator 10 and the shield 80. Thus, according to the present embodiment, the electronic component 1 can be miniaturized compared to the case where the distance between the resonator 10 and the shield 80 is the same as the distance between the resonator 30 and the shield 80.

Next, the result of a simulation examining the effect of the shield 80 on the characteristics of the electronic component 1 will be described. The simulation used a model of a practical example corresponding to the electronic component 1 according to the present embodiment and a model of a comparative example corresponding to an electronic component according to the comparative example. In the simulation, the model of the practical example was created so that the distance from each of the inductors L32, L33, and L34 of the resonator 30 and the inductors L41 and L42 of the LC circuit 40 to the top covering portion 80B of the shield 80 in the electronic component 1 fell within the range of 150 to 220 μm.

The electronic component of the comparative example had basically the same configuration as that of the electronic component 1 according to the present embodiment. In the simulation, the model of the comparative example was created so that the distance from each of the inductors L32, L33, and L34 of the resonator 30 and the inductors L41 and L42 of the LC circuit 40 to the top covering portion 80B of the shield 80 in the electronic component of the comparative example was 30 μm.

In the simulation, the passband of the second filter constituted by the resonator 30 was 3300 MHz or more and 5000 MHz or less. The passband of the third filter constituted by the resonator 20 was 1428 MHz or more and 2690 MHz or less. The second filter will hereinafter be referred to also as a high band filter, and the third filter as a middle band filter.

Figure 17:
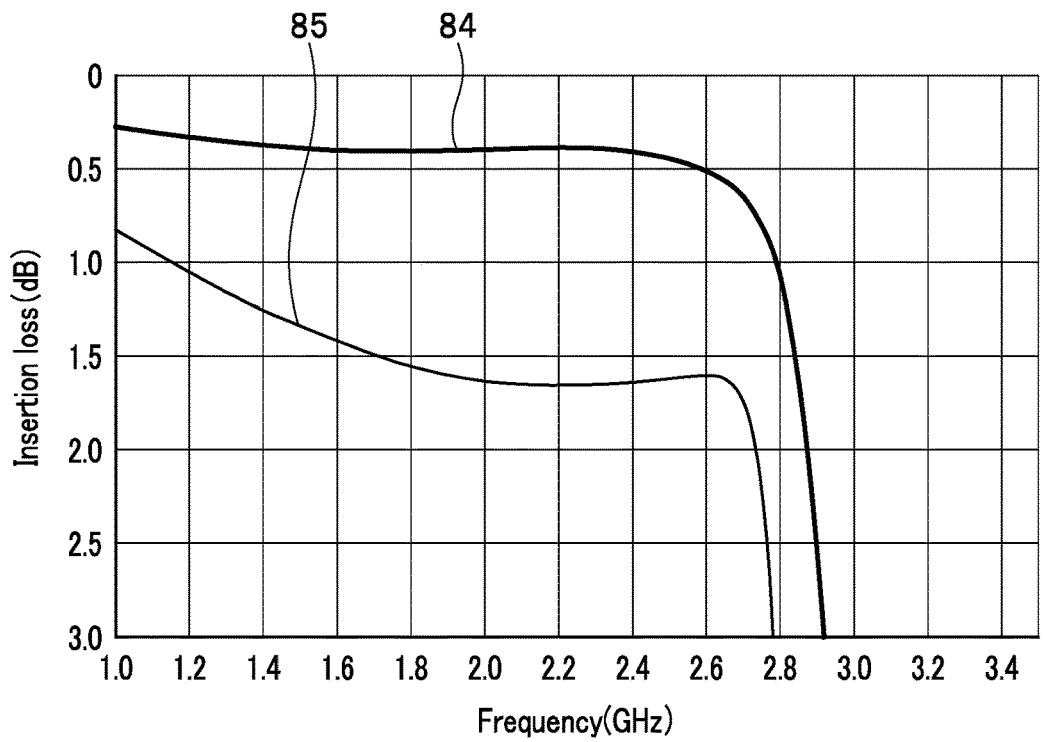
FIG. 17 is a characteristic diagram showing the insertion loss of a middle band filter determined by a simulation.
Figure 18:
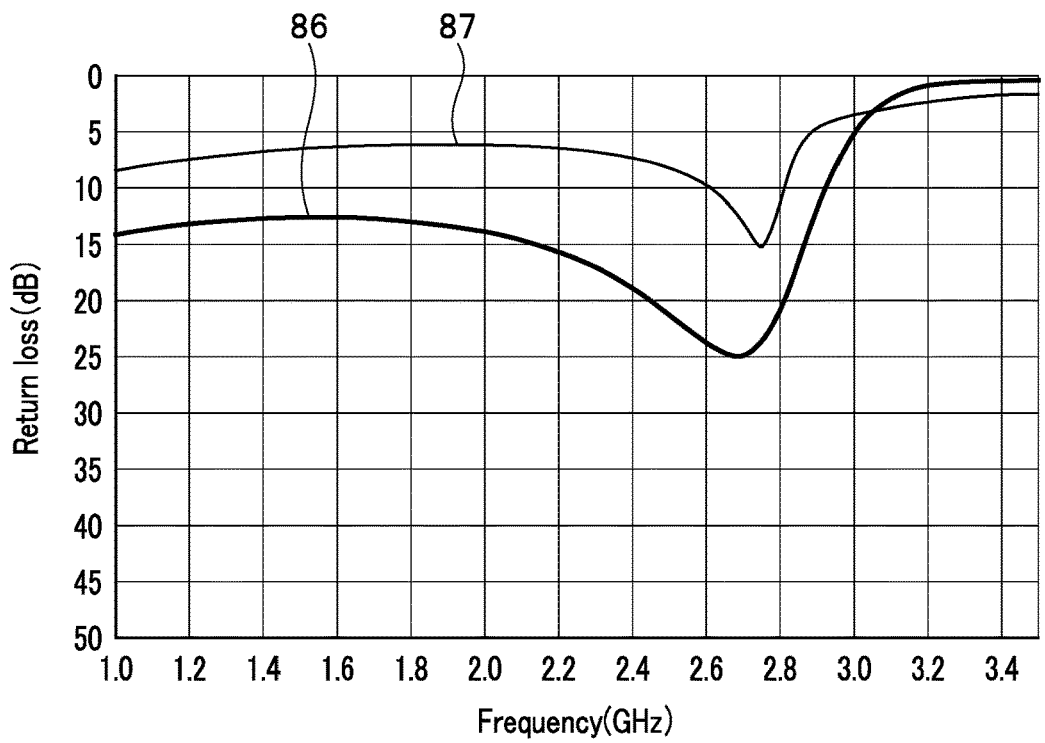
FIG. 18 is a characteristic diagram showing the return loss of the middle band filter determined by a simulation.
Figure 19:
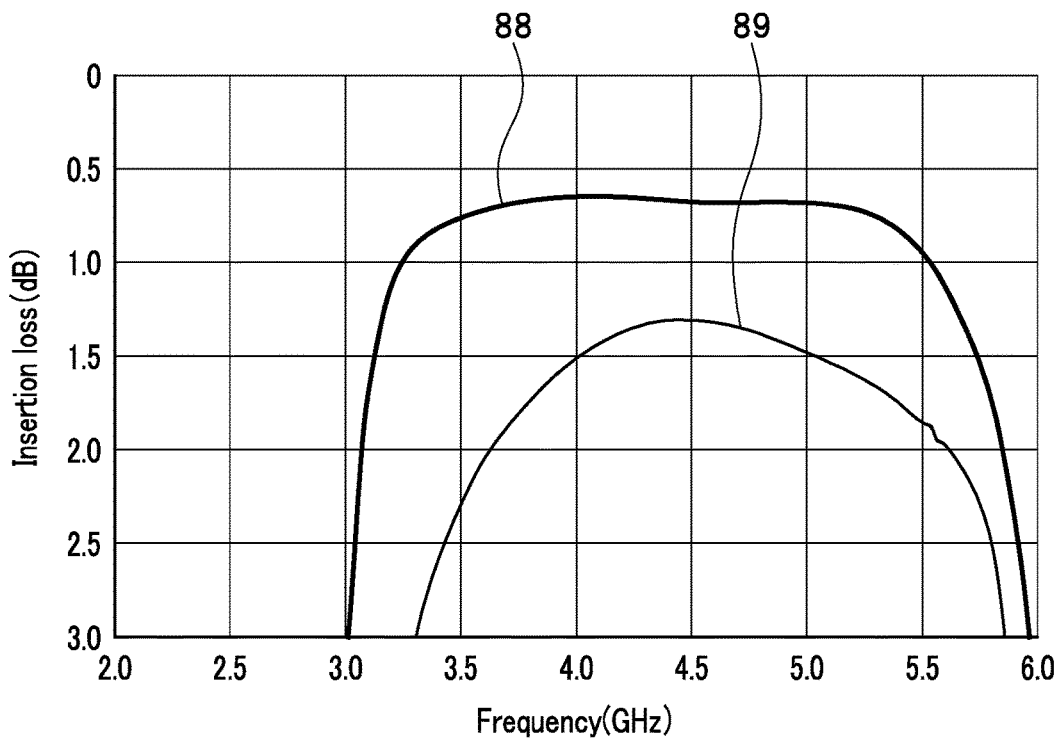
FIG. 19 is a characteristic diagram showing the insertion loss of a high band filter determined by a simulation.
Figure 20:
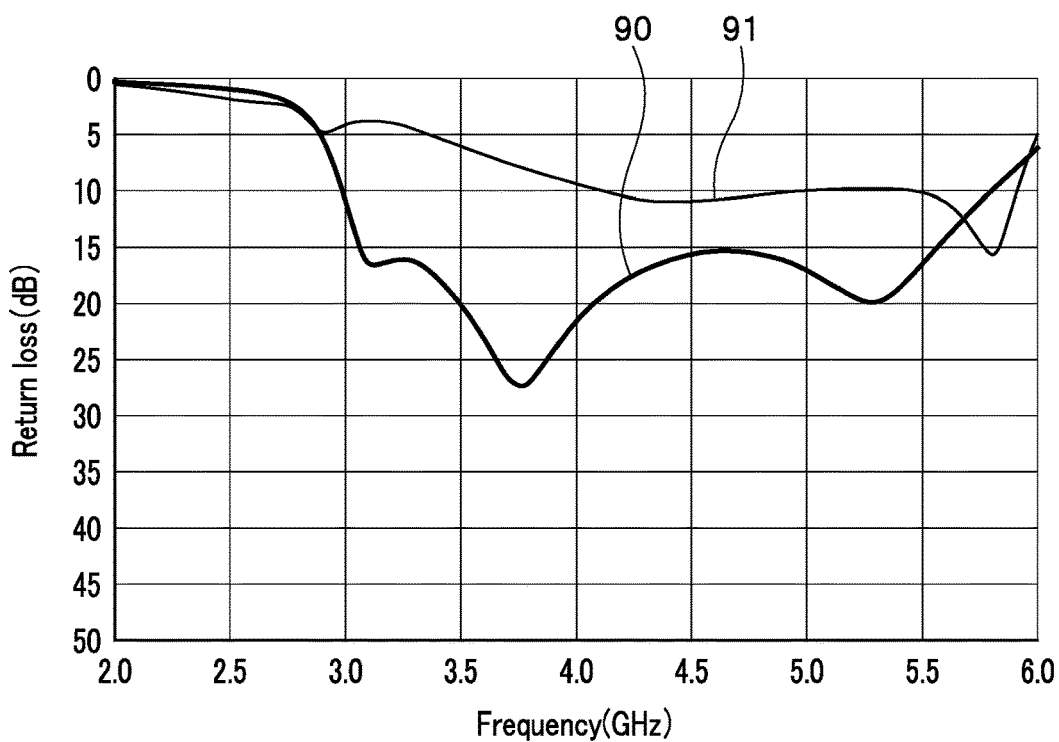
FIG. 20 is a characteristic diagram showing the return loss of the high band filter determined by a simulation.

FIG. 17 is a characteristic chart showing the insertion loss of the middle band filter (third filter). FIG. 18 is a characteristic chart showing the return loss of the middle band filter (third filter). FIG. 19 is a characteristic chart showing the insertion loss of the high band filter (second filter). FIG. 20 is a characteristic chart showing the return loss of the high band filter (second filter). In FIGS. 17 to 20, the horizontal axis indicates the frequency. In FIGS. 17 and 19, the vertical axis indicates the insertion loss. In FIGS. 18 and 20, the vertical axis indicates the return loss.

In FIG. 17, the curve denoted by the reference numeral 84 represents the insertion loss of the middle band filter in the model of the practical example. The curve denoted by the reference numeral 85 represents the insertion loss of the middle band filter in the model of the comparative example. In FIG. 18, the curve denoted by the reference numeral 86 represents the return loss of the middle band filter in the model of the practical example. The curve denoted by the reference numeral 87 represents the return loss of the middle band filter in the model of the comparative example. In FIG. 19, the curve denoted by the reference numeral 88 represents the insertion loss of the high band filter in the model of the practical example. The curve denoted by the reference numeral 89 represents the insertion loss of the high band filter in the model of the comparative example. In FIG. 20, the curve denoted by the reference numeral 90 represents the return loss of the high band filter in the model of the practical example. The curve denoted by the reference numeral 91 represents the return loss of the high band filter in the model of the comparative example.

As shown in FIGS. 17 and 19, both the middle band filter and the high band filter of the model of the comparative example had higher insertion loss than the model of the practical example in the respective passbands. As shown in FIGS. 18 and 20, both the middle band filter and the high band filter of the model of the comparative example had lower return loss than the model of the practical example in the respective passbands. The reason why the model of the comparative example had low return loss as described above is that the impedance of the filters in their respective passbands was too low to achieve impedance matching. As a result, the model of the comparative example had high insertion loss.

From the result of the simulation, it can be seen that worsening in the characteristics of the high band filter (second filter) can be prevented by locating the inductors L32, L33, and L34 of the resonator 30 away from the top covering portion 80B of the shield 80. Similarly, it can be seen from the result of the simulation that worsening in the characteristics of the middle band filter (third filter) can be prevented by locating the inductors L41 and L42 of the LC circuit 40 away from the top covering portion 80B of the shield 80.

In the simulation, the distance from each of the resonator 30 and the LC circuit 40 to the top covering portion 80B of the shield 80 was changed. However, the result of the simulation applies not only to the top covering portion 80B of the shield 80, but also to other portions of the shield 80. More specifically, worsening in the characteristics of the high band filter (second filter) can also be prevented by locating the resonator 30 away from the portions of the shield 80 other than the top covering portion 80B. Similarly, worsening in the characteristics of the middle band filter (third filter) can also be prevented by locating the LC circuit 40 away from the portions of the shield 80 other than the top covering portion 80B.

The present invention is not limited to the foregoing embodiment, and various modifications may be made thereto. For example, the electronic component according to the present invention may be a diplexer for separating two signals of different frequency bands, or an electronic component that handles a plurality of signals of different frequencies other than a branching filter.

The electronic component 1 may include a circuit including one or more inductors instead of the LC circuit 40.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiment.

What is claimed is:

1. A multilayer electronic component comprising:
a common port;
a first signal port that selectively passes a first signal of a frequency within a first passband;
a second signal port that selectively passes a second signal of a frequency within a second passband higher than the first passband;
a first resonator provided between the common port and the first signal port in a circuit configuration;
a second resonator provided between the common port and the second signal port in the circuit configuration;
a stack for integrating the common port, the first signal port, the second signal port, the first resonator, and the second resonator, the stack including a plurality of dielectric layers and a plurality of conductor layers stacked together; and
a shield that is formed of a conductor and covers a part of a surface of the stack, wherein:
the first and second resonators are formed using the plurality of conductor layers;
the stack has a bottom surface and a top surface located at both ends in a stacking direction of the plurality of dielectric layers, and four side surfaces connecting the bottom surface and the top surface;
the shield includes a specific portion opposed to both the first and second resonators;
a distance between the second resonator and the specific portion is greater than a distance between the first resonator and the specific portion; and
the first resonator is not interposed between the second resonator and the specific portion.

2. The multilayer electronic component according to claim 1, wherein:
the shield includes a side covering portion that covers one of the four side surfaces as at least a part of the specific portion; and
a distance between the second resonator and the side covering portion is greater than a distance between the first resonator and the side covering portion.

3. The multilayer electronic component according to claim 1, wherein:
the shield includes a top covering portion that covers the top surface as at least a part of the specific portion; and
a distance between the second resonator and the top covering portion is greater than a distance between the first resonator and the top covering portion.

4. The multilayer electronic component according to claim 1, wherein:
the first resonator includes at least one first inductor;
the second resonator includes at least one second inductor; and
a distance between the at least one second inductor and the specific portion is greater than a distance between the at least one first inductor and the specific portion.

5. The multilayer electronic component according to claim 1, wherein:
the first resonator includes at least one first capacitor;
the second resonator includes at least one second capacitor; and
a distance between the at least one second capacitor and the specific portion is greater than a distance between the at least one first capacitor and the specific portion.

6. The multilayer electronic component according to claim 1, further comprising a circuit that is provided between the common port and the first resonator in the circuit configuration and includes at least one element formed using the plurality of conductor layers, wherein:
the specific portion is opposed to the circuit; and
a distance between the circuit and the specific portion is greater than the distance between the first resonator and the specific portion.

7. The multilayer electronic component according to claim 6, wherein the element is an inductor.

8. The multilayer electronic component according to claim 1, wherein:
the common port, the first signal port, and the second signal port are provided on the bottom surface of the stack; and
the shield entirely covers the top surface and the four side surfaces.

9. The multilayer electronic component according to claim 1, further comprising:
a third signal port that selectively passes a third signal of a frequency within a third passband higher than the first passband and lower than the second passband; and
a third resonator provided between the common port and the third signal port in the circuit configuration, wherein
the third resonator is formed using the plurality of conductor layers.

10. The multilayer electronic component according to claim 9, wherein:
the specific portion is opposed to the third resonator; and
the distance between the second resonator and the specific portion is greater than a distance between the third resonator and the specific portion.

11. The multilayer electronic component according to claim 9, wherein:
the specific portion is opposed to the third resonator; and
a distance between the third resonator and the specific portion is greater than the distance between the first resonator and the specific portion.

12. A multilayer electronic component comprising:
a common port;
a first signal port that selectively passes a first signal of a frequency within a first passband;
a second signal port that selectively passes a second signal of a frequency within a second passband higher than the first passband;
a first resonator provided between the common port and the first signal port in a circuit configuration;
a second resonator provided between the common port and the second signal port in the circuit configuration;
a stack for integrating the common port, the first signal port, the second signal port, the first resonator, and the second resonator, the stack including a plurality of dielectric layers and a plurality of conductor layers stacked together; and
a shield that is formed of a conductor and covers a part of a surface of the stack, wherein:
the first and second resonators are formed using the plurality of conductor layers;
the stack has a bottom surface and a top surface located at both ends in a stacking direction of the plurality of dielectric layers, and four side surfaces connecting the bottom surface and the top surface;
the shield includes a specific portion opposed to both the first and second resonators;
a distance between the second resonator and the specific portion is greater than a distance between the first resonator and the specific portion;
a circuit that is provided between the common port and the first resonator in the circuit configuration and includes at least one element formed using the plurality of conductor layers, wherein:
the specific portion is opposed to the circuit; and
a distance between the circuit and the specific portion is greater than the distance between the first resonator and the specific portion.

13. A multilayer electronic component comprising:
a common port;
a first signal port that selectively passes a first signal of a frequency within a first passband;
a second signal port that selectively passes a second signal of a frequency within a second passband higher than the first passband;
a first resonator provided between the common port and the first signal port in a circuit configuration;
a second resonator provided between the common port and the second signal port in the circuit configuration;
a stack for integrating the common port, the first signal port, the second signal port, the first resonator, and the second resonator, the stack including a plurality of dielectric layers and a plurality of conductor layers stacked together; and
a shield that is formed of a conductor and covers a part of a surface of the stack, wherein:
the first and second resonators are formed using the plurality of conductor layers;
the stack has a bottom surface and a top surface located at both ends in a stacking direction of the plurality of dielectric layers, and four side surfaces connecting the bottom surface and the top surface;
the shield includes a specific portion opposed to both the first and second resonators;
a distance between the second resonator and the specific portion is greater than a distance between the first resonator and the specific portion;
a third signal port that selectively passes a third signal of a frequency within a third passband higher than the first passband and lower than the second passband;
a third resonator provided between the common port and the third signal port in the circuit configuration, wherein
the third resonator is formed using the plurality of conductor layers;
the specific portion is opposed to the third resonator; and the distance between the second resonator and the specific portion is greater than a distance between the third resonator and the specific portion.

* * * * *